(12) United States Patent
Lee

(10) Patent No.: US 9,294,813 B2
(45) Date of Patent: Mar. 22, 2016

(54) PROBABILISTIC METHODS AND APPARATUS TO DETERMINE THE STATE OF A MEDIA DEVICE

(71) Applicant: The Nielsen Company (US), LLC, Schaumburg, IL (US)

(72) Inventor: Morris Lee, Palm Harbor, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 87 days.

(21) Appl. No.: 14/307,152

(22) Filed: Jun. 17, 2014

(65) Prior Publication Data

US 2014/0298367 A1 Oct. 2, 2014

Related U.S. Application Data

(63) Continuation of application No. 12/263,150, filed on Oct. 31, 2008, now Pat. No. 8,793,717.

(51) Int. Cl.
*H04N 21/234* (2011.01)
*H04N 21/442* (2011.01)
(Continued)

(52) U.S. Cl.
CPC .............. *H04N 21/442* (2013.01); *H04H 60/32* (2013.01); *H04N 7/163* (2013.01);
(Continued)

(58) Field of Classification Search
CPC .......... H04N 21/442; H04N 21/44227; H04N 21/23418; H04N 21/42202; H04N 21/42203
See application file for complete search history.

(56) References Cited

U.S. PATENT DOCUMENTS 3,281,695 A 10/1966 Bass
3,315,160 A 4/1967 Goodman
(Continued)

FOREIGN PATENT DOCUMENTS

AU 2006279518 2/2007
CN 1244982 A 2/2000
(Continued)

OTHER PUBLICATIONS

State Intellectual Property Office of China, "Office Action," issued in connection with Chinese Application No. 201110288875.2, dated Oct. 30, 2013, and corresponding English translation, 8 pages.
(Continued)

*Primary Examiner* — Pinkal R Chokshi
(74) *Attorney, Agent, or Firm* — Hanley, Flight & Zimmerman, LLC

(57) ABSTRACT

Probabilistic methods and apparatus to determine the state of a media device are described. An example method includes generating, based on a first output signal from a first sensor, a first parameter value representative of a first property of a media device; generating, based on a second output signal from a second sensor, a second parameter value representative of a second property of the media device; calculating a first state probability that the media device is presenting media provided by a first source based on a first conditional probability associated with the first parameter value and a second conditional probability associated with the second parameter value; calculating a second state probability that the media device is presenting media provided by a second source different than the first source based on a third conditional probability associated with the first parameter value and a fourth conditional probability associated with the second parameter value; and generating a state identifier by comparing the first state probability and the second state probability.

20 Claims, 10 Drawing Sheets

(51) Int. Cl.
*H04H 60/32* (2008.01)
*H04N 7/16* (2011.01)
*H04N 21/466* (2011.01)
*H04N 21/422* (2011.01)

(52) U.S. Cl.
CPC .... *H04N 21/23418* (2013.01); *H04N 21/4424* (2013.01); *H04N 21/4663* (2013.01); *H04N 21/42202* (2013.01); *H04N 21/42203* (2013.01); *H04N 21/44227* (2013.01)

(56) References Cited

U.S. PATENT DOCUMENTS

| | | |
|---|---|---|
| 3,483,327 A | 12/1969 | Schwartz |
| 3,633,112 A | 1/1972 | Anderson |
| 3,651,471 A | 3/1972 | Haselwood et al. |
| 3,733,430 A | 5/1973 | Thompson et al. |
| 3,803,349 A | 4/1974 | Watanabe |
| 3,906,454 A | 9/1975 | Martin |
| 3,947,624 A | 3/1976 | Miyake |
| 4,027,332 A | 5/1977 | Wu et al. |
| 4,044,376 A | 8/1977 | Porter |
| 4,058,829 A | 11/1977 | Thompson |
| 4,245,245 A | 1/1981 | Matsumoto et al. |
| 4,388,644 A | 6/1983 | Ishman et al. |
| 4,546,382 A | 10/1985 | McKenna et al. |
| 4,566,030 A | 1/1986 | Nickerson et al. |
| 4,574,304 A | 3/1986 | Watanabe et al. |
| 4,613,904 A | 9/1986 | Lurie |
| 4,622,583 A | 11/1986 | Watanabe et al. |
| 4,642,685 A | 2/1987 | Roberts et al. |
| 4,644,393 A | 2/1987 | Smith et al. |
| 4,647,964 A | 3/1987 | Weinblatt |
| 4,697,209 A | 9/1987 | Kiewit et al. |
| 4,723,302 A | 2/1988 | Fulmer et al. |
| 4,764,808 A | 8/1988 | Solar |
| 4,769,697 A | 9/1988 | Gilley et al. |
| 4,779,198 A | 10/1988 | Lurie |
| 4,800,437 A | 1/1989 | Hosoya |
| 4,807,031 A | 2/1989 | Broughton et al. |
| 4,876,736 A | 10/1989 | Kiewit |
| 4,885,632 A | 12/1989 | Mabey et al. |
| 4,907,079 A | 3/1990 | Turner et al. |
| 4,912,552 A | 3/1990 | Allison, III et al. |
| 4,931,865 A | 6/1990 | Scarampi |
| 4,943,963 A | 7/1990 | Waechter et al. |
| 4,965,825 A | 10/1990 | Harvey et al. |
| 4,972,503 A | 11/1990 | Zurlinden |
| 5,097,328 A | 3/1992 | Boyette |
| 5,136,644 A | 8/1992 | Audebert et al. |
| 5,165,069 A | 11/1992 | Vitt et al. |
| 5,226,177 A | 7/1993 | Nickerson |
| 5,235,414 A | 8/1993 | Cohen |
| 5,251,324 A | 10/1993 | McMullan, Jr. |
| 5,310,222 A | 5/1994 | Chatwin et al. |
| 5,319,453 A | 6/1994 | Copriviza et al. |
| 5,335,277 A | 8/1994 | Harvey et al. |
| 5,355,161 A | 10/1994 | Bird et al. |
| 5,398,055 A | 3/1995 | Nonomura et al. |
| 5,404,161 A | 4/1995 | Douglass et al. |
| 5,404,172 A | 4/1995 | Berman et al. |
| 5,408,258 A | 4/1995 | Kolessar |
| 5,425,100 A | 6/1995 | Thomas et al. |
| 5,481,294 A | 1/1996 | Thomas et al. |
| 5,483,276 A | 1/1996 | Brooks et al. |
| 5,488,408 A | 1/1996 | Maduzia et al. |
| 5,505,901 A | 4/1996 | Harney et al. |
| 5,512,933 A | 4/1996 | Wheatley et al. |
| 5,550,928 A | 8/1996 | Lu et al. |
| 5,659,367 A | 8/1997 | Yuen |
| 5,760,760 A | 6/1998 | Helms |
| 5,767,922 A | 6/1998 | Zabih et al. |
| 5,771,307 A | 6/1998 | Lu et al. |
| 5,801,747 A | 9/1998 | Bedard |
| 5,874,724 A | 2/1999 | Cato |
| 5,889,548 A | 3/1999 | Chan |
| 5,896,554 A | 4/1999 | Itoh |
| 5,963,844 A | 10/1999 | Dail |
| 6,035,177 A | 3/2000 | Moses et al. |
| 6,049,286 A | 4/2000 | Forr |
| 6,124,877 A | 9/2000 | Schmidt |
| 6,137,539 A | 10/2000 | Lownes et al. |
| 6,154,548 A | 11/2000 | Bizzan |
| 6,175,634 B1 | 1/2001 | Graumann |
| 6,177,931 B1 | 1/2001 | Alexander et al. |
| 6,184,918 B1 | 2/2001 | Goldschmidt Iki et al. |
| 6,286,140 B1 | 9/2001 | Ivanyi |
| 6,297,859 B1 | 10/2001 | George |
| 6,311,214 B1 | 10/2001 | Rhoads |
| 6,388,662 B2 | 5/2002 | Narui et al. |
| 6,400,996 B1 | 6/2002 | Hoffberg et al. |
| 6,457,010 B1 | 9/2002 | Eldering et al. |
| 6,463,413 B1 | 10/2002 | Applebaum et al. |
| 6,467,089 B1 | 10/2002 | Aust et al. |
| 6,477,508 B1 | 11/2002 | Lazar et al. |
| 6,487,719 B1 | 11/2002 | Itoh et al. |
| 6,519,769 B1 | 2/2003 | Hopple et al. |
| 6,523,175 B1 | 2/2003 | Chan |
| 6,529,212 B2 | 3/2003 | Miller et al. |
| 6,542,878 B1 | 4/2003 | Heckerman et al. |
| 6,567,978 B1 | 5/2003 | Jarrell |
| 6,570,559 B1 | 5/2003 | Oshima |
| 6,647,212 B1 | 11/2003 | Toriumi et al. |
| 6,647,548 B1 | 11/2003 | Lu et al. |
| 6,675,383 B1 | 1/2004 | Wheeler et al. |
| 6,681,396 B1 | 1/2004 | Bates et al. |
| 6,791,472 B1 | 9/2004 | Hoffberg |
| 6,934,508 B2 | 8/2005 | Ceresoli et al. |
| 6,946,803 B2 | 9/2005 | Moore |
| 6,954,745 B2 | 10/2005 | Rajan |
| 7,051,352 B1 | 5/2006 | Schaffer |
| 7,100,181 B2 | 8/2006 | Srinivasan et al. |
| 7,150,030 B1 | 12/2006 | Eldering et al. |
| 7,587,732 B2 | 9/2009 | Wright et al. |
| 7,647,604 B2 | 1/2010 | Ramaswamy |
| 7,712,114 B2 | 5/2010 | Ramaswamy |
| 7,769,757 B2 | 8/2010 | Grefenstette et al. |
| 7,882,514 B2 | 2/2011 | Nielsen et al. |
| 7,954,120 B2 | 5/2011 | Roberts et al. |
| 8,108,888 B2 | 1/2012 | Ramaswamy |
| 8,180,712 B2 | 5/2012 | Nelson et al. |
| 8,526,626 B2 | 9/2013 | Nielsen et al. |
| 2002/0012353 A1 | 1/2002 | Gerszberg et al. |
| 2002/0015112 A1 | 2/2002 | Nagakubo et al. |
| 2002/0026635 A1 | 2/2002 | Wheeler et al. |
| 2002/0056087 A1 | 5/2002 | Berezowski et al. |
| 2002/0057893 A1 | 5/2002 | Wood et al. |
| 2002/0059577 A1 | 5/2002 | Lu et al. |
| 2002/0072952 A1 | 6/2002 | Hamzy et al. |
| 2002/0077880 A1 | 6/2002 | Gordon et al. |
| 2002/0080286 A1 | 6/2002 | Dagtas et al. |
| 2002/0083435 A1 | 6/2002 | Blasko et al. |
| 2002/0141730 A1 | 10/2002 | Haken |
| 2002/0174425 A1 | 11/2002 | Markel et al. |
| 2002/0198762 A1 | 12/2002 | Donato |
| 2003/0046685 A1 | 3/2003 | Srinivasan et al. |
| 2003/0054757 A1 | 3/2003 | Kolessar et al. |
| 2003/0056215 A1 | 3/2003 | Kanungo |
| 2003/0067459 A1 | 4/2003 | Lim |
| 2003/0093790 A1 | 5/2003 | Logan et al. |
| 2003/0101449 A1 | 5/2003 | Bentolila et al. |
| 2003/0110485 A1 | 6/2003 | Lu et al. |
| 2003/0115591 A1 | 6/2003 | Weissmueller et al. |
| 2003/0131350 A1 | 7/2003 | Peiffer et al. |
| 2003/0216120 A1 | 11/2003 | Ceresoli et al. |
| 2004/0003394 A1 | 1/2004 | Ramaswamy |
| 2004/0055020 A1 | 3/2004 | Delpuch |
| 2004/0058675 A1 | 3/2004 | Lu et al. |
| 2004/0073918 A1 | 4/2004 | Ferman et al. |
| 2004/0088212 A1 | 5/2004 | Hill |
| 2004/0088721 A1 | 5/2004 | Wheeler et al. |
| 2004/0100437 A1 | 5/2004 | Hunter et al. |
| 2004/0117816 A1 | 6/2004 | Karaoguz et al. |
| 2004/0181799 A1 | 9/2004 | Lu et al. |

(56) References Cited

U.S. PATENT DOCUMENTS

| | | |
|---|---|---|
| 2004/0210922 A1 | 10/2004 | Peiffer et al. |
| 2004/0233126 A1 | 11/2004 | Moore |
| 2005/0054285 A1 | 3/2005 | Mears et al. |
| 2005/0057550 A1 | 3/2005 | George |
| 2005/0125820 A1 | 6/2005 | Nelson et al. |
| 2005/0221774 A1 | 10/2005 | Ceresoli et al. |
| 2005/0286860 A1 | 12/2005 | Conklin |
| 2006/0062401 A1 | 3/2006 | Neervoort et al. |
| 2006/0075421 A1 | 4/2006 | Roberts et al. |
| 2006/0080314 A1 | 4/2006 | Hubert et al. |
| 2006/0093998 A1 | 5/2006 | Vertegaal |
| 2006/0195857 A1 | 8/2006 | Wheeler et al. |
| 2006/0212895 A1 | 9/2006 | Johnson |
| 2006/0232575 A1 | 10/2006 | Nielsen |
| 2007/0011040 A1 | 1/2007 | Wright et al. |
| 2007/0050832 A1 | 3/2007 | Wright et al. |
| 2007/0061830 A1 | 3/2007 | Chang |
| 2007/0063850 A1 | 3/2007 | Devaul et al. |
| 2007/0186228 A1 | 8/2007 | Ramaswamy et al. |
| 2007/0192782 A1 | 8/2007 | Ramaswamy |
| 2007/0288628 A1 | 12/2007 | Sadovsky et al. |
| 2008/0028427 A1 | 1/2008 | Nesvadba et al. |
| 2008/0148307 A1 | 6/2008 | Nielsen et al. |
| 2008/0154858 A1 | 6/2008 | Manavoglu et al. |
| 2008/0276265 A1 | 11/2008 | Topchy et al. |
| 2009/0064252 A1* | 3/2009 | Howarter ........... H04N 21/2385 725/114 |
| 2009/0260027 A1 | 10/2009 | Weinblatt |
| 2012/0102515 A1 | 4/2012 | Ramaswamy |
| 2012/0102518 A1 | 4/2012 | Wheeler et al. |
| 2014/0007153 A1 | 1/2014 | Nielsen et al. |

FOREIGN PATENT DOCUMENTS

| | | |
|---|---|---|
| DE | 3401762 | 8/1985 |
| EP | 0283570 | 9/1988 |
| EP | 0593202 | 4/1994 |
| EP | 0946012 | 9/1999 |
| EP | 1160772 | 12/2001 |
| EP | 1318679 | 6/2003 |
| EP | 1411326 | 4/2004 |
| GB | 1574964 | 9/1980 |
| JP | 8331482 | 12/1996 |
| JP | 2000307520 | 11/2000 |
| WO | 9115062 | 10/1991 |
| WO | 9512278 | 5/1995 |
| WO | 9526106 | 9/1995 |
| WO | 9810539 | 3/1998 |
| WO | 9832251 | 7/1998 |
| WO | 9933206 | 7/1999 |
| WO | 9959275 | 11/1999 |
| WO | 0038360 | 6/2000 |
| WO | 0072484 | 11/2000 |
| WO | 0111506 | 2/2001 |
| WO | 0145103 | 6/2001 |
| WO | 0161892 | 8/2001 |
| WO | 0219581 | 3/2002 |
| WO | 02052759 | 7/2002 |
| WO | 03049339 | 6/2003 |
| WO | 03052552 | 6/2003 |
| WO | 03060630 | 7/2003 |
| WO | 2005032145 | 4/2005 |
| WO | 2005038625 | 4/2005 |
| WO | 2005041166 | 5/2005 |
| WO | 2005055601 | 6/2005 |
| WO | 2005065159 | 7/2005 |
| WO | 2005079457 | 9/2005 |
| WO | 2006012629 | 2/2006 |
| WO | 2006020560 | 2/2006 |
| WO | 2007022250 | 2/2007 |
| WO | 2007120518 | 10/2007 |
| WO | 2008033136 | 3/2008 |

OTHER PUBLICATIONS

Tsekeridou et al., "Content-Based Video Parsing and Indexing Based on Audio-Visual Interaction," IEEE Transactions on Circuits and Systems for Video Technology, vol. 11 No. 4, Apr. 1, 2001, pp. 522-535.

Extended European Search Report, issued by the European Patent Office in connection with European Patent Application No. 11009958.7, on Jul. 18, 2012, 10 pages.

"Communication Pursuant to Article 94(3) EPC," issued by the European Patent Office in connection with European Patent Application No. 11009958.7, on Mar. 20, 2013, 4 pages.

Notice of Allowance, issued by the Korean Intellectual Property Office in connection with Korean Patent Application No. 10-2007-7005373, on Dec. 24, 2012, 3 pages.

Notice of Allowance. issued by the Canadian Intellectual Property Office in connection with Canadian Patent Application No. 257865. on Oct. 2, 2012, 1 page.

Notice of Allowance, issued by the State Intellectual Property Office of China P.R. in connection with Chinese Patent Application No. 200580030202X, on Jun. 21, 2013, 5 pages.

Fourth Office Action, issued by the State Intellectual Property Office of China P.R. in connection with Chinese Patent Application No. 200580030202X, on Mar. 18, 2013, 6 pages.

IP Australia, "Notice of Allowance," issued in connection with Australian Patent Application No. 2010201753, dated Apr. 17, 2012 (3 pages).

IP Australia, "Examiner's First Report," issued in connection with Australian Patent Application No. 2010219320, dated Jun. 20, 2012 (4 pages).

EPO, "Summons to Attend Oral Proceedings Pursuant to Rule 115(1) EPC," issued in connection with European Patent Application No. 05798239.9, mailed Dec. 22, 2011 (3 pages).

EPO, "Communication Pursuant to Rule 62a(1) EPC and Rule 63(1) EPC," issued in connection with European Patent Application No. 11009958.7, mailed Mar. 27, 2012 (3 pages).

KIPO, "Notice of Preliminary Rejection," issued in connection with Korean Patent Application No. 10-2007-7005373, mailed May 30, 2012 (5 pages).

PCT, "International Preliminary Report on Patentability," issued in connection with PCT Application No. PCT/US2003/030355, mailed Mar. 28, 2011 (6 pages).

PCT, "International Search Report and Written Opinion," issued in connection with PCT Application No. PCT/US2005/028106, mailed Mar. 12, 2007 (11 pages).

PCT, "International Preliminary Report on Patentability," issued in connection with PCT Application No. PCT/US2005/028106, mailed Mar. 27, 2007 (4 pages).

PCT, "International Preliminary Report on Patentability," issued in connection with PCT Application No. PCT/US2006/031960, mailed Feb. 20, 2008 (4 pages).

Lu et al., "Content Analysis for Audio Classification and Segmentation," IEEE Transactions on Speech and Audio Processing, vol. 10, No. 7, Oct. 2002, (14 pages).

State Intellectual Property Office of China, "Rejection Decision," issued in connection with Chinese Patent Application No. 200580030202.X, dated Mar. 24, 2011 (9 pages).

European Patent Office, "Communication Pursuant to Article 94(3) EPC," issued in connection with European Application No. 05 798 239.9-220 on Dec. 27, 2010 (4 pages).

Korean Intellectual Property Office, "Notice of Preliminary Rejection," issued in connection with Korean Patent Application No. 10-2007-7005373, mailed on Oct. 31, 2011 (5 pages).

IP Australia, "Examiner's Response," issued in connection with Australian Patent Application No. 2010201753, mailed on Mar. 23, 2011, (2 pages).

Canadian Intellectual Property Office, "Office Action," issued in connection with Canadian Patent Application No. 2,576,865, mailed on Jun. 17, 2011 (3 pages).

(56) References Cited

OTHER PUBLICATIONS

European Patent Office, "Communication Pursuant to Article 94(3) EPC," issued in connection with European Patent Application No. 05 798239.9 (related to U.S. Appl. No. 111672,706), on Dec. 8, 2009 (5 pages).

Intellectual Property Office of New Zealand, "Examination Report," issued in connection with New Zealand Patent Application No. 553385 (related to U.S. Appl. No. 11/672,706), mailed Nov. 18, 2009 (2 pages).

Mexican Patent Office, "Official Action," issued in connection with Mexican Patent Application Serial No. MX/a/2007/001734, on Jul. 24, 2009, and an English Language Translation (5 pages).

State Intellectual Property Office of China, English Language Translation of the First Office Action issued by the State Intellectual Property Office of China in connection with the Chinese Patent Application Serial No. 200580030202X, on Jun. 5, 2009, (11 pages).

IP Australia, "Examiner's First Report," issued in connection with the Australian Patent Application Serial No. 2005273948, on May 22, 2009 (2 pages).

Austrian Patent Office Service and Information Center, (TRF), "Written Opinion," issued in connection with Singaporean Patent Application Serial No. 200700990-5, mailed on Jun. 23, 2009 (4 pages).

Ministry of Economic Development of New Zealand, "Examination Report," issued in connection with New Zealand Patent Application Serial No. 553385, on Oct. 17, 2008 (2 pages).

Canadian Intellectual Property Office (CIPO). "Office Action" issued in connection with Canadian Patent Application Serial No. 2,576,865, mailed Mar. 29, 2010 (5 pages).

Intellectual Property Office of New Zealand, "Examination Report and Notice of Acceptance of Complete Specification," issued in connection with New Zealand Patent Application No. 553385, on May 27, 2010 (2 pages).

IP Australia, "Notice of Acceptance," in connection with Patent Application No. 2006279518, mailed on May 28, 2010 (4 pages).

IP Australia, "Standard Patent Granted," issued in connection with Australian Patent No. 2006279518, on Sep. 23, 2010 (1 page).

State Intellectual Property Office of China, "Second Office Action (with translation)," issued in connection with Chinese Patent Application No. 200680036510.8, issued on Mar. 24, 2010 (5 pages).

State Intellectual Property Office of China, "Notification of Publication of Application," in connection with Chinese Application No. 200680036510.8, issued on Oct. 17, 2008 (1 page).

State Intellectual Property Office of China, "First Office Action, (with translation)," in connection with Chinese Patent Application No. 200680036510.8, issued on Jul. 10, 2009 (10 pages).

Patents Registry, Intellectual Property Department of Hong Kong, "Grant of Request for Registration and Grant," in connection with Application No. 09101551.0, issued on Mar. 22, 2011 (5 pages).

State Intellectual Property Office of China, "Notice of Allowance," issued in connection with Chinese Patent Application No. 200680036510.8, on Aug. 9, 2010 (4 pages).

Mexican Patent Office, "Office Action," issued in connection with Mexican Patent Application No. MX/ a/2008/002317, on Aug. 19, 2010 (2 pages).

IP Australia, "Notice of Acceptance," in connection with Australian Patent Application No. 2005273948, on Jan. 20, 2010 (3 pages).

Andrieu et al., "Bayesian Blind Marginal Separation of Convolutively Mixed Discrete Sources," Proceedings of the 1998 IEEE Signal Processing Society Workshop, Department of Engineering, Cambridge, UK, 1998 IEEE, (10 pages).

Rajon et al., "Bayesian approach to parameter estimation and interpolation of time-varying autoregressive process using the Gibbs sampler," 1EE Proceedings: Vision, Image, and Signal Processing, Institution of Electrical Engineers, 1997, (8 pages).

European Patent Office, "Extended European Search Report," issued by the European Patent Office on Dec. 1, 2009, in connection with European application No. 09013713.4-2221, (8 pages).

Thomas, William L., "Television Audience Research Technology, Today's Systems and Tomorrow's Challenges," Nielsen Media Research, Jun. 5, 1992 (4 pages).

Vincent et al., "A Tentative Typology of Audio Source Separation Tasks," 41th International Symposium on Independent Component Analysis and Blind Signal Separation (ICA 2003), held in Nara, Japan, Apr. 2003 (6 pages).

Smith, Leslie S., "Using liDs to Estimate Sound Source Direction," Proceedings of the Seventh International Conference on Simulation of Adaptive Behavior on from Animals to Animats, pp. 60-61, 2002 (2 pages).

The Peltarion Blog, Jul. 10, 2006 [Retrieved from the Internet on Mar. 11, 2009] Retrieved from the Internet: http//blog.peltarion.com/2006/07/10/classifier-showdown (14 pages).

Logical Connective: Philosophy 103: Introduction to Logic Conjunction, Negation, and Disjunction, [Retrieved from the Internet on 200-03-11] Retrieved from the Internet: http://philosophy.lander.edu/logic/conjunct.html (5 pages).

Naive Bayes Classifier, Wikipedia entry as of Mar. 11, 2009 [Retrieved from the Internet on Mar. 11, 2009] (7 pages).

Naive Bayes Classifier, Wikipedia entry as of Jan. 11, 2008 [Retrieved from the Internet from Wikipedia history pages on Mar. 11, 2009] (7 pages).

Zimmerman, H., Fuzzy set applications in pattern recognition and data-analysis, 11th IAPR International conference on Pattern Recognition, Aug. 29, 1992 (81 pages).

Patent Cooperation Treaty, "Written Opinion of the International Searching Authority," issued by the International Searching Authority in connection with PCT application No. PCT/US2003/030355, mailed Mar. 21, 2008 (5 pages).

Patent Cooperation Treaty, "International Search Report," issued by the International Searching Authority in connection with PCT application No. PCT/US2003/030355, mailed May 5, 2004 (6 pages).

Patent Cooperation Treaty, "International Preliminary Examination Report," issued by the International Preliminary Examining Authority in connection with PCT application No. PCT/US2003/030370, mailed Mar. 7, 2005 (4 pages).

Patent Cooperation Treaty, "International Search Report," issued by the International Searching Authority in connection with PCT application No. PCT/US2003/030370, mailed Mar. 11, 2004 (1 page).

Patent Cooperation Treaty, "Written Opinion of the International Searching Authority," issued by the International Searching Authority in connection with PCT application No. PCT/US2003/030370, mailed Nov. 15, 2004 (5 pages).

European Patent Office, "Extended European Search Report," issued in connection with European Patent Application No. EP05798239.9, on Sep. 9, 2008 (4 pages).

Patent Cooperation Treaty, "International Search Report," issued by the International Searching Authority in connection with PCT application No. PCT/US2006/031960, mailed Feb. 21, 2007 (2 pages).

Patent Cooperation Treaty, "Written Opinion of the International Searching Authority," issued by the International Searching Authority in connection with PCT application No. PCT/US2006/031960, mailed Feb. 21, 2007 (3 pages).

Zhang, Harry "The Optimality of Naive Bayes," 2004, American Association for the Advancement of Artificial Intelligence, 2004 (6 Pages).

Domingos et al., "On the Optimality of the Simple Bayesian Classifier under Zero-One Loss,", Department of Information and Computer Science, University of California, California, Jul. 30, 1997, [retrieved from the Internet on Feb. 29, 2008]. Retrieved from the Internet: http://www.cs.washington.edu/homes/pedrod.mlj97.ps.gz, (28 Pages).

Perez et al., "A Probalistic Framework for Recognizing Similar Actions using Spatio-Temporal Features," University of Oxford, (England), [retrieved from the Internet on Feb. 29, 2008]. Retrieved from the Internet: http://www.dcs.warwick.ac.uklbmvc2007/proceedings/CD-ROM/papers/paper-161.pdf, (10 Pages).

Elkan, Charles "Naive Bayesian Learning," Department of Computer Science, Harvard University, Cambridge, Massachusetts, Sep. 1997 (4 Pages).

(56) References Cited

OTHER PUBLICATIONS

Mitchell, Tom M. "Generative and Discriminative Classifiers: Naive Bayes and Logistic Regression," Sep. 21, 2006, [retrieved from the Internet on Feb. 29, 2008]. Retrieved from the Internet: http://www.cs.cmu.eduHom/mlbook/NBayesLogReg.pdf, (17 pages).

Lang, Markus "Implementation of Naive Bayesian Classifiers in Java," Department of Zweibrucken, Kaiserslautern University of Applied Sciences, (Germany), [retrieved from the Internet on Feb. 29, 2008]. Retrieved from the Internet: http://www.iit.eduHpro356f03/ipro/documents/naive-bayes.doc, (4 Pages).

Liang et al., "Learning Naive Bayes Tree for Conditional Probability Estimation," University of New Brunswick, (Canada), [retrieved from the Internet on Feb. 29, 2008]. Retrieved from the Internet: http://www.flydragontech.com/publications/2006/CAI06.pdf, (13 Pages).

Mozina et al., "Nomograms for Visualization of Naive Bayesian Classifier," [retrieved from the Internet on Feb. 29, 2008]. Retrieved from the Internet: http://www.ailab.si/blaz/papers/2004-PKDD.pdf, (12 Pages).

Naive Bayes Classification, Lecture 3 [retrieved from the Internet on Feb. 29, 2008]. Retrieved from the Internet: http://www.cs.toronto.edu/-zemei/Courses?CS411/Lect?03bayes.pdf, (9 Pages).

Klein, "CS 188: Artificial Intelligence Fall 2007: Lecture 23 Naive Bayes," University of Berkeley, California, Nov. 15, 2007, [retrieved from the Internet on Feb. 29, 2008]. Retrieved from the Internet: http://www.inst.eecs.berkeley.edu/-cs188/fa07/sliders/FA07%20cs188%20lecture%2023%20--%20bayes%20(6PP).pdf, (6 Pages).

Learning Bayesian Networks: Naive and non-Naive Bayes, Oregon States University, Oregon, [retrieved from the Internet on Feb. 29, 2008]. Retrieved from the Internet: http://web.engr.oregonstate.edu/-tgd/classes/534/slides/part6.pdf, (18 Pages).

The Naive Bayes Classifier, Oregon States University, Oregon, [retrieved from the Internet on Feb. 29, 2008]. Retrieved from the Internet: http://web.engr.oregonstate.edu/-afern/classes/cs534/notes/Naivebayes-10.pdf, (19 Pages).

Bayesian Networks: Machine Learning A: 708.064 07W 1sst KU, [retrieved from the Internet on Feb. 29, 2008]. Retrieved from the Internet: http://www.igi.tugraz.at/lehre/MLA?WS07/slides3.pdf, (21 Pages).

The Peltarion Blog, Aug. 3, 2006 [retrieved from the Internet on Feb. 29, 2008]. Retrieved from the Internet: http://blog.peltarion.com/img/cs/csl.png, (9 Pages).

Logical Connective: Philosophy 103 Introduction to Logic; Cojunction, Negation, and Disjunction, [retrieved from the Internet on Feb. 29, 2008]. Retrieved from the Internet: http://philosophy.lander.edu/logic/images/graphics/conjunct.jpg, (7 Pages).

Wikipedia, "Naive Bayes Classifier," Wikipedia, [retrieved from the Internet on Feb. 29, 2008]. Retrieved from the Internet: http://www.en.wikipedia.org/wiki/Naive_bayes, (11 Pages).

Dai et al., "Transferring Naïve Bayes Classifiers for Text Classification," 2007, 6 pages, Association for the Advancement of Artificial Intelligence.

State Intellectual Property Office of China, "Office Action," issued in connection with Chinese Application No. 201110288875.2, dated Jul. 18, 2014, and corresponding English translation, 8 pages.

The United States Patent and Trademark Office, Notice of Allowance mailed on Oct. 28, 2013 in connection with U.S. Appl. No. 13/341,575 (9 pages).

The United States Patent and Trademark Office, Non-Final Office action mailed on Jul. 10, 2013 in connection with U.S. Appl. No. 13/341,575 (11 pages).

The United States Patent and Trademark Office, Notice of Allowance mailed on Apr. 24, 2013 in connection with U.S. Appl. No. 12/831,870 (8 pages).

The United States Patent and Trademark Office, Non-Final Office action mailed on Nov. 29, 2012 in connection with U.S. Appl. No. 12/831,870 (8 pages).

The United States Patent and Trademark Office, Advisory Action mailed on Jan. 7, 2010 in connection with U.S. Appl. No. 11/388,262 (3 pages).

United States Patent and Trademark Office, "Notice of Allowance," issued in connection with U.S. Appl. No. 12/725,018 mailed on Jun. 27, 2011 (7 pages).

United States Patent and Trademark Office, "Notice of Allowance," issued in connection with U.S. Appl. No. 11/576,328, on Apr. 7, 2010 (8 pages).

United States Patent and Trademark Office, "Advisory Action Before the Filing an Appeal Brief," issued in connection with U.S. Appl. No. 11/388,555, on Mar. 22, 2010 (3 pages).

United States Patent and Trademark Office, "Notice of Allowance," issued in connection with U.S. Appl. No. 11/388,555, on May 20, 2010 (4 pages).

United States Patent and Trademark Office, "Non-Final Office Action," issued in connection with U.S. Appl. No. 11/388,262 on Apr. 28, 2010 (11 pages).

United States Patent and Trademark Office, "Interview Summary," issued in connection with U.S. Appl. No. 11/388,262 on Sep. 28, 2010 (3 pages).

United States Patent and Trademark Office, "Final Office Action," issued in connection with U.S. Appl. No. 11/388,262 on Oct. 12, 2010 (11 pages).

United States Patent and Trademark Office, "Notice of Panel Decision from Pre-Appeal Brief Review," issued in connection with U.S. Appl. No. 11/388,262 on Feb. 28, 2011 (2 pages).

United States Patent and Trademark Office, "Examiner's Answer to Appeal Brief," issued in connection with U.S. Appl. No. 11/388,262 on Aug. 4, 2011 (20 pages).

United States Patent and Trademark Office, "Notice of Allowance and Fee(s) Due," in connection with U.S. Appl. No. 111672,706, mailed Dec. 31, 2009 (16 pages).

United States Patent and Trademark Office. "Final Office Action," issued in connection with U.S. Appl. No. 11/388,555, on Dec. 8, 2009 (15 pages).

United States Patent and Trademark Office, "Non-Final Office Action," issued in connection with U.S. Appl. No. 11/388,555, on Mar. 31, 2009 (10 pages).

United States Patent and Trademark Office, "Final Office Action," issued in connection with U.S. Appl. No. 11/388,262, on Sep. 2, 2009 (13 pages).

United States Patent and Trademark Office, "Non-Final Office Action," issued in connection with U.S. Appl. No. 11/672,706, on Jul. 23, 2009 (8 pages).

United States Patent and Trademark Office, "Non-Final Office Action," issued in connection with U.S. Appl. No. 11/576,328, on Aug. 7, 2009 (11 pages).

Non-Final Office Action issued by the United States Patent and Trademark Office on Feb. 5, 2009, in connection with U.S. Appl. No. 11/576,328 (20 pages).

Non-Final Office Action issued by the United States Patent and Trademark Office on Mar. 5, 2009, in connection with U.S. Appl. No. 11/388,262 (22 pages).

Non-Final Office Action issued by the United States Patent and Trademark Office on Dec. 27, 2007, in connection with U.S. Appl. No. 11/388,555 (12 pages).

Final Office Action issued by the United States Patent and Trademark Office on Oct. 6, 2008, in connection with U.S. Appl. No. 11/388,555 (18 pages).

Advisory Action issued by the United States Patent and Trademark Office on Jan. 13, 2009, in connection with U.S. Appl. No. 11/388,555 (4 pages).

United States Patent and Trademark Office, "Non-Final Office Action," issued in connection with U.S. Appl. No. 12/263,150, Jul. 18, 2011, 51 pages.

United States Patent and Trademark Office, "Final Office Action," issued in connection with U.S. Appl. No. 12/263,150, Nov. 18, 2011, 28 pages.

(56) References Cited

OTHER PUBLICATIONS

United States Patent and Trademark Office, "Non-Final Office Action," issued in connection with U.S. Appl. No. 12/263,150, Mar. 6, 2013, 37 pages.

United States Patent and Trademark Office, "Final Office Action," issued in connection with U.S. Appl. No. 12/263,150, Jul. 25, 2013, 25 pages.

United States Patent and Trademark Office, "Notice of Allowance and Fee(s) Due," issued in connection with U.S. Appl. No. 12/263,150, Dec. 10, 2013, 19 pages.

United States Patent and Trademark Office, "Notice of Allowance and Fee(s) Due," issued in connection with U.S. Appl. No. 12/263,150, Mar. 31, 2014, 15 pages.

* cited by examiner

| GAIN | AVERAGE ENERGY | AUDIO SIGNATURES | VISIBLE LIGHT | VIDEO FRAMES | CURRENT | IR AVERAGE ENERGY | IR FREQUENCY | AM AVERAGE ENERGY | STATE |
|---|---|---|---|---|---|---|---|---|---|
| 0.0 | 2.0 | 2.0 | 2.0 | 2.0 | 1.0 | 2.0 | 2.0 | 2.0 | OFF |
| 1.0 | 2.0 | 2.0 | 2.0 | 1.0 | 1.0 | 2.0 | 0.0 | 2.0 | OFF |
| 0.0 | 0.0 | 2.0 | 2.0 | 0.0 | 1.0 | 0.0 | 1.0 | 2.0 | OFF |
| 1.0 | 1.0 | 2.0 | 0.0 | 2.0 | 1.0 | 2.0 | 2.0 | 2.0 | OFF |
| 1.0 | 2.0 | 2.0 | 2.0 | 1.0 | 0.0 | 2.0 | 2.0 | 2.0 | OFF |
| 1.0 | 1.0 | 1.0 | 2.0 | 2.0 | 0.0 | 0.0 | 2.0 | 1.0 | OFF |
| 1.0 | 0.0 | 2.0 | 1.0 | 2.0 | 1.0 | 1.0 | 2.0 | 2.0 | OFF |
| 1.0 | 0.0 | 2.0 | 2.0 | 1.0 | 1.0 | 2.0 | 2.0 | 2.0 | OFF |
| 1.0 | 2.0 | 2.0 | 2.0 | 2.0 | 0.0 | 2.0 | 2.0 | 1.0 | OFF |
| 2.0 | 1.0 | 2.0 | 1.0 | 1.0 | 2.0 | 2.0 | 2.0 | 2.0 | TV ON |
| 1.0 | 2.0 | 0.0 | 0.0 | 0.0 | 2.0 | 0.0 | 0.0 | 2.0 | TV ON |
| 2.0 | 2.0 | 2.0 | 1.0 | 1.0 | 2.0 | 0.0 | 1.0 | 1.0 | TV ON |
| 1.0 | 1.0 | 2.0 | 0.0 | 0.0 | 2.0 | 2.0 | 1.0 | 1.0 | TV ON |
| 1.0 | 2.0 | 2.0 | 0.0 | 1.0 | 1.0 | 2.0 | 0.0 | 2.0 | TV ON |
| 2.0 | 2.0 | 0.0 | 1.0 | 0.0 | 2.0 | 2.0 | 2.0 | 1.0 | TV ON |
| 2.0 | 2.0 | 2.0 | 1.0 | 1.0 | 1.0 | 1.0 | 1.0 | 1.0 | TV ON |
| 2.0 | 1.0 | 2.0 | 1.0 | 0.0 | 2.0 | 2.0 | 1.0 | 1.0 | TV ON |
| 2.0 | 2.0 | 1.0 | 0.0 | 0.0 | 1.0 | 0.0 | 0.0 | 2.0 | TV ON |
| 1.0 | 2.0 | 2.0 | 0.0 | 2.0 | 0.0 | 2.0 | 1.0 | 2.0 | GAME ON |
| 1.0 | 2.0 | 2.0 | 2.0 | 0.0 | 2.0 | 2.0 | 1.0 | 0.0 | GAME ON |
| 1.0 | 2.0 | 2.0 | 1.0 | 0.0 | 1.0 | 2.0 | 1.0 | 2.0 | GAME ON |
| 0.0 | 2.0 | 2.0 | 2.0 | 1.0 | 0.0 | 2.0 | 0.0 | 2.0 | GAME ON |
| 1.0 | 2.0 | 2.0 | 1.0 | 1.0 | 2.0 | 2.0 | 1.0 | 2.0 | GAME ON |
| 0.0 | 1.0 | 2.0 | 2.0 | 0.0 | 0.0 | 2.0 | 1.0 | 1.0 | GAME ON |
| 0.0 | 2.0 | 2.0 | 2.0 | 1.0 | 1.0 | 2.0 | 1.0 | 1.0 | GAME ON |
| 1.0 | 2.0 | 1.0 | 0.0 | 0.0 | 1.0 | 1.0 | 1.0 | 2.0 | GAME ON |
| 0.0 | 1.0 | 2.0 | 0.0 | 1.0 | 2.0 | 2.0 | 1.0 | 1.0 | GAME ON |
| 1.0 | 1.0 | 0.0 | 2.0 | 1.0 | 2.0 | 2.0 | 1.0 | 0.0 | GAME ON |

| PARAMETER | NORMALIZED PARAMETER VALUE | WEIGHT | | |
|---|---|---|---|---|
| | | STATE 1 (OFF) | STATE 2 (TELEVISION ON) | STATE 3 (GAMING SYSTEM ON) |
| GAIN | 0.0 | 2 | 0 | 4 |
| | 1.0 | 8 | 3 | 6 |
| | 2.0 | 0 | 7 | 0 |
| AVERAGE ENERGY | 0.0 | 4 | 1 | 0 |
| | 1.0 | 2 | 3 | 3 |
| | 2.0 | 4 | 6 | 7 |
| AUDIO SIGNATURES | 0.0 | 0 | 2 | 1 |
| | 1.0 | 2 | 1 | 1 |
| | 2.0 | 8 | 7 | 8 |
| VISIBLE LIGHT | 0.0 | 1 | 5 | 3 |
| | 1.0 | 1 | 5 | 2 |
| | 2.0 | 8 | 0 | 5 |
| VIDEO FRAMES | 0.0 | 1 | 3 | 4 |
| | 1.0 | 4 | 7 | 5 |
| | 2.0 | 5 | 0 | 1 |
| CURRENT | 0.0 | 3 | 0 | 4 |
| | 1.0 | 7 | 3 | 2 |
| | 2.0 | 0 | 7 | 4 |
| IR AVERAGE ENERGY | 0.0 | 3 | 3 | 2 |
| | 1.0 | 1 | 1 | 0 |
| | 2.0 | 6 | 6 | 8 |
| IR FREQUENCY | 0.0 | 1 | 4 | 1 |
| | 1.0 | 1 | 6 | 9 |
| | 2.0 | 8 | 0 | 0 |
| AM AVERAGE ENERGY | 0.0 | 0 | 0 | 3 |
| | 1.0 | 2 | 5 | 2 |
| | 2.0 | 8 | 5 | 5 |
| TOTAL INSTANCES | - | 10 | 10 | 10 |

| PARAMETER | NORMALIZED PARAMETER VALUE | WEIGHT | | |
|---|---|---|---|---|
| | | STATE 1 (OFF) | STATE 2 (TELEVISION ON) | STATE 3 (GAMING SYSTEM ON) |
| GAIN | 0.0 | 2 | 0 | 4 |
| AVERAGE ENERGY | 2.0 | 4 | 6 | 7 |
| AUDIO SIGNATURES | 2.0 | 8 | 7 | 8 |
| VISIBLE LIGHT | 2.0 | 8 | 0 | 5 |
| VIDEO FRAMES | 2.0 | 5 | 0 | 1 |
| CURRENT | 1.0 | 7 | 3 | 2 |
| IR AVERAGE ENERGY | 2.0 | 6 | 6 | 8 |
| IR FREQUENCY | 2.0 | 8 | 0 | 0 |
| AM AVERAGE ENERGY | 2.0 | 8 | 5 | 5 |
| MEDIA STATE CONFIDENCE | | -6.8691 | -15.0388 | -10.7245 |

PROBABILISTIC METHODS AND APPARATUS TO DETERMINE THE STATE OF A MEDIA DEVICE

RELATED APPLICATION

This patent arises from a continuation of U.S. patent application Ser. No. 12/263,150, filed Oct. 31, 2008, now U.S. Pat. No. 8,793,717, which is hereby incorporated herein by reference in its entirety.

FIELD OF THE DISCLOSURE

The present disclosure relates generally to audience measurement and, more particularly, to probabilistic methods and apparatus to determine the state of a media device.

BACKGROUND

Media ratings and metering information enables media producers and media device manufacturers to improve their media programming or media device functionality and also enables media producers to determine a price to be charged for advertising broadcast during such media programming. In addition, accurate media device usage demographics enables advertisers to target audiences of a desired size and/or audiences composed of members having a set of common, desired characteristics (e.g., income level, lifestyles, interests, etc.).

Metering information and media ratings are typically generated by collecting media consumption or exposure information from a group of statistically selected individuals and/or households. Each of the statistically selected individuals and/or households typically has a data logging and processing unit commonly referred to as a "meter." In households of individuals having multiple media devices, the data logging and processing functionality may be distributed among multiple meters or metering units, where each metering unit may be provided for each media device or media presentation area. The metering unit includes sensors to gather data from the monitored media devices (e.g., audio-video (AV) devices) at the selected site.

The collected media device data is subsequently used to generate a variety of information or statistics related to media device usage including, for example, audience sizes, audience demographics, audience preferences, the total number of hours of media device usage per individual and/or per region, etc.

The configurations of automated metering systems vary depending on the equipment used to receive, process, and display media device signals in each environment being monitored. For example, homes that receive cable television signals and/or satellite television signals typically include a metering unit in the form of a set top box (STB) to receive media signals from a cable and/or satellite television provider. Media systems configured in this manner are typically monitored using hardware, firmware, and/or software to interface with the STB to extract or to generate signal information. Such hardware, firmware, and/or software may be adapted to perform a variety of monitoring tasks including, for example, detecting the channel tuning status of a tuning device disposed in or otherwise associated with the STB, extracting program identification codes embedded in media signals received at the STB, generating signatures characteristic of media signals received at the STB, etc. However, many audio/video media systems that include an STB are configured such that the STB may be powered independent of the media device (e.g., an audio/video presentation device). As a result, the STB may be turned on (i.e., powered up) and continue to supply media signals to the media device even when the media device is turned off. Additionally, while the media device may be on, the media device may be used for gaming or watching DVDs. Thus, the monitoring of media devices having independent power supplies or more than one active state typically involves an additional device or method to determine the operational status of the media device to ensure that the collected data reflects information about the signals from the metered media device.

BRIEF DESCRIPTION OF THE DRAWINGS

FIG. 4 is a table showing an example training set for the example Naïve Bayes Module of FIG. 2.

FIG. 5 is a table showing trained weights for the example Naïve Bayes Module of FIG. 2 derived from the training set of FIG. 4.

DETAILED DESCRIPTION

Figure 1:
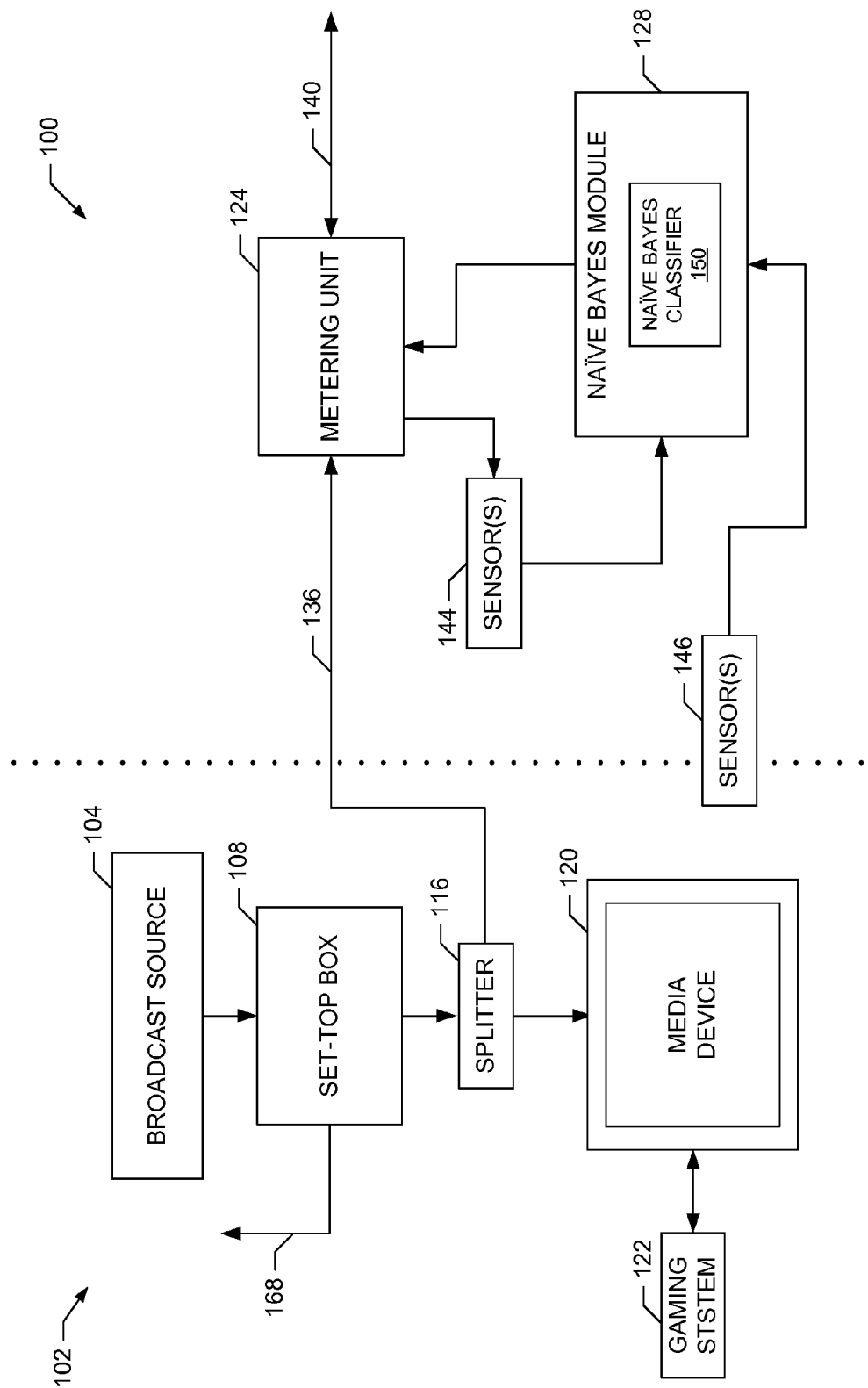
FIG. 1 is a block diagram showing a metering system including an example Naïve Bayes Module monitoring a media device.

Example probabilistic methods and apparatus to determine the state of a media device are described. In one example, a method involves processing a first output signal from a first sensor measuring a first property of the media device to generate a first parameter value and processing a second output signal from a second sensor measuring a second property of the media device to generate a second parameter value. Next, the method combines first conditional probabilities of the first parameter value and the second parameter value to determine a first state probability for the first state of the media device, wherein the first conditional probabilities are representative of probabilities the first parameter value corresponds to the media device being in a first state. The method further combines second conditional probabilities of the first parameter value and the second parameter value to determine a second state probability for the second state of the media device, wherein the second parameter conditional probabilities are representative of probabilities second parameter value corresponds to the media device being in a second state. Then, the method determines the state of the media device by selecting the greater of the first state probability or the second state probability.

Prior to receiving the first output signal from the first sensor, the first conditional probabilities are calculated. The first conditional probabilities of the first parameter value and the second parameter value are determined by placing a training media device into the first state, recording a first set of first parameter values, recording a second set of second parameter values, calculating a probability distribution of the first parameter values in the first set, and calculating a probability distribution of the second parameter values in the second set. Likewise, the second conditional probabilities of the first parameter value and the second parameter value are determined by placing the training media device into the second state, recording a third set of first parameter values, recording a fourth set of second parameter values, calculating a probability distribution of the first parameter values in the third set, and calculating a probability distribution of the second parameter values in the fourth set.

In another example, an apparatus includes a parameter generator to process a first output signal from a first sensor measuring a first property of the media device to generate a first parameter value and to process a second output signal from a second sensor measuring a second property of the media device to generate a second parameter value. Additionally, the example apparatus includes a classifier to combine first conditional probabilities of the first parameter value and the second parameter value to determine a first state probability for the first state of the media device, wherein the first conditional probabilities are representative of probabilities the first parameter value corresponds to the media device being in a first state. Additionally, the classifier combines second conditional probabilities of the first parameter value and the second parameter value to determine a second state probability for the second state of the media device, wherein the second conditional probabilities are representative of probabilities second parameter value corresponds to the media device being in a second state. Furthermore, the example classifier determines the state of the media device by selecting the greater of the first state probability or the second state probability.

Although the following discloses example apparatus including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

The example apparatus and methods to determine the state of a media device using a Naïve Bayes Classifier described herein provide accurate data to advertisers, media device manufacturers, application developers, and/or producers of media content. The Naïve Bayes Classifier maybe be included within a metering system and/or communicatively coupled to a metering system configured to meter one or more media devices. The metering data from the metering system generates usage information and provides an accurate representation of the usage information of persons in metered environments (e.g., individuals, households, etc.).

Generating accurate metering data is difficult because media devices have become complex in functionality and interoperability. As a result, media device manufacturers are developing standardized interfaces to ease the set-up and connection of these devices (e.g., HDMI-CEC). However, capturing accurate metering information from media devices is still a challenge. For example, a metered entertainment system may include a digital television, a cable receiver, one or more gaming systems, a DVD player, a satellite audio receiver, and a connection to a personal computer with access to the Internet. A metering unit configured to detect audio gain signals or visible light may have a difficult time discerning which media device is being used or viewed by an individual and/or household. If the metering device is unable to accurately determine which devices are used (e.g., the media device state), the metered information loses value for the advertisers, the media device producers, the media device manufacturers, and/or any other interested groups.

Media device states may be physical states of a media device or, alternatively, may be application and/or software enabled states of a media device. Physical states of a media device include states of a single media device communicatively coupled to one or more media devices. For example, a television may be in an OFF state, displaying television programming from a cable receiver, displaying a video game from a gaming system, and/or displaying a movie from a DVD. Furthermore, physical states of a media device may include an ON state, an OFF state, a standby state, a video displaying state, an audio playing state, a configuration state, etc. Additionally, media device states may include states of a single media device with one or more embedded applications. For example, a cellular telephone includes a call state, a text messaging state, an instant messaging state, an audio listening state, a streaming media content state, a document processing state, and/or a web browsing state.

Many methods exist for determining an ON state or an OFF state of a single media device. These methods utilize sensors associated with a meter and process the data from the sensors within the meter while the meter is located within the metered environment. The sensors meter complex media devices configurations including media devices with two or more states. For example, sensors communicatively coupled to a metering device may detect audio signals associated with the operation of televisions (e.g., 15.75 kHz signals from the power unit of CRT displays), video signals (e.g. light levels), electromagnetic fields associated with a media device and/or remote control signals (e.g., radio frequency or infrared signals). The sensors send the collected data to a metering device that processes the data using one or more algorithms to determine if the media device is in an ON state or an OFF state. Currently, many known algorithms are only capable of determining a threshold for the collected data such that data above certain thresholds indicates the media device is in an ON state while data below the thresholds indicates the media device is in an OFF state. However, if the device is in an ON state, these known algorithms are not capable of determining the content source providing content for the media device.

The example methods described herein use a Naïve Bayes Classifier to determine a state of media devices including media devices with two or more states. The Naïve Bayes Classifier is a probabilistic classifier based on applying Bayes' theorem with strong naïve independence assumptions. The Naïve Bayes Classifier is capable of quickly processing a large number of variables independently with a high degree of classification accuracy. The Naïve Bayes Classifier enables the determination of two or more states from one or more independent data sources.

In order to determine a state of a media device using one or more inputs, the Naïve Bayes Classifier is trained with a set of training examples. The training examples set a training media device into the one or more possible states with the Naïve Bayes Classifier recording the corresponding sensor outputs from sensors monitoring the training media device. By knowing the possible range of sensor outputs (e.g., variance of outputs) for a given media device state, the Naïve Bayes Classifier can determine a media device state from similar sensor outputs. In other words, the training set provides an estimation of the means and variances of sensor outputs for each possible state of a metered device. Because the sensor outputs are processed and calculated within a Naïve Bayes Classifier independently there is no covariance between the sensor outputs enabling more accurate state classification.

In the example apparatus described herein the Naïve Bayes Classifier may be included within a module that processes sensor outputs and includes one or more preliminary classifiers. A preliminary classifier is a classifier that processes one or more parameters using an algorithm such as a Fuzzy Logic algorithm that outputs a value used by the Naïve Bayes Classifier to determine the state of a media device.

In an example implementation, a Naïve Bayes Classifier may be trained to detect the state of a television. The possible states include a television in an ON state, a television displaying content from a game system, a television displaying content provided by a DVD player, or a television in an OFF state. The Naïve Bayes Classifier is included in a metering unit that includes a parameter generator to convert sensor output signals into normalized digital data and preliminary classifiers to pre-process some of the normalized data.

Prior to use in a metering environment, the Naïve Bayes Classifier is trained by placing a training media device into each of its possible states while the Naïve Bayes Classifier records the parameters generated from the sensor outputs to determine the parameter ranges for each input state. The training media device is representative of the types of media devices the Naïve Bayes Classifier will be configured to meter. Different media devices and/or different types of media device states have corresponding training media devices and training sets. The Naïve Bayes Classifier calculates probabilities associated with each media device state for each range of parameter values.

Upon training, the metering unit is deployed to a household and/or to a media device of a panel member. Upon deployment, sensors connected to the metering unit output sensed information to the parameter generator. The parameter generator converts the sensor outputs to digital data and sends the digital data to the Naïve Bayes Classifier. Additionally, the parameter generator may send some of the digital data to one or more preliminary classifiers. Upon receiving the digital data from either the parameter generator or the preliminary classifiers, the Naïve Bayes Classifier calculates the state of the media device by determining a probability of each state for each parameter type from the training set, combining the probabilities of the parameters for each state, and selecting the state with the highest probability.

A block diagram of an example metering system 100 capable of providing viewing and metering information for program content presented via an example media system 102 is illustrated in FIG. 1. The example media system 102 includes a broadcast source 104, a set-top box (STB) 108, a signal splitter 116, a media device 120, and a gaming system 122. The example metering system 100 includes a metering unit 124, sensors 144 and 146, and a Naïve Bayes Module 128 with a Naïve Bayes Classifier 150. The components of the media system 102 and the metering system 100 may be connected in any manner including that shown in FIG. 1. For example, in a statistically selected household having one or more media systems 102, the metering unit 124 may be implemented as a single home unit and one or more site units. In such a configuration, the single home unit may perform the functions of storing data and forwarding the stored data to a central facility for subsequent processing. Each site unit is coupled to a corresponding media system 102 and performs the functions of collecting viewing/metering data, processing such data (e.g., in real-time) and sending the processed data to the single home unit for that home. The home unit receives and stores the data collected by the site units and subsequently forwards that collected data to the central facility.

The broadcast source 104 may be any broadcast media source, such as a cable television service provider, a satellite television service provider, a radio frequency (RF) television service provider, an internet streaming video/audio provider, etc. The broadcast source 104 may provide analog and/or digital television signals to the media system 102 (e.g., a home entertainment system), for example, over a coaxial cable or via a wireless connection.

The STB 108 may be any set-top box, such as a cable television converter, a direct broadcast satellite (DBS) decoder, a video cassette recorder (VCR), etc. The set-top box 108 receives a plurality of broadcast channels from the broadcast source 104. Typically, the STB 108 selects one of the plurality of broadcast channels based on a user input, and outputs one or more signals received via the selected broadcast channel. In the case of an analog signal, the STB 108 tunes to a particular channel to obtain programming delivered on that channel. For a digital signal, the STB 108 may tune to a channel and decode certain packets of data to obtain programming delivered on a selected channel. For example, the STB 108 may tune to a major channel and then extract a program carried on a minor channel within the major channel via the decoding process mentioned above. For some media systems 102 such as those in which the broadcast source 104 is a standard RF analog television service provider or a basic analog cable television service provider, the STB 108 may not be present as its function is performed by a tuner in the display device 120.

In the illustrated example, an output from the STB 108 is fed to the signal splitter 116, which may be implemented as a single analog y-splitter (in the case of an RF coaxial connection between the STB 108 and the media device 120) or an audio/video splitter (in the case of a direct audio/video connection between the STB 108 and the media device 120). For configurations in which the STB 108 is not present, the broadcast source 104 may be coupled directly to the signal splitter 116. In the example media system 102, the signal splitter 116 produces two signals indicative of the output from the STB 108. However, any number of signals may be produced by the signal splitter 116.

In the illustrated example, one of the two signals from the signal splitter 116 is connected to the media device 120 and the other signal is delivered to the metering unit 124. The media device 120 may be any type of video display device. For example, the display device 120 may be a television and/or other display device (e.g., a computer monitor, a CRT, an LCD, etc.) that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, or may be a multimedia computer system, etc.

In other example implementations the media device 120 may include or be incorporated as an audio player, a portable video device, a cell phone, a personal digital assistant (PDA), a personal computer, a laptop, a DVD player, a portable gaming machine, a satellite radio player, an in-vehicle entertainment system, and/or any other type of device capable of playing audio or displaying media type information.

The media system 102 of FIG. 1 includes the gaming system 122, which is communicatively coupled to the media device 120. The gaming system 122 may be any type of gaming system 122 capable of providing a user interface with a video game displayed via the media device 120. The gaming system 122 may be in an OFF state while the media device 120 is in an ON state (e.g., when a panel member is watching television) or the gaming system 122 and the media device may both be in ON states (e.g., when a panel member is playing a video game). Furthermore, the gaming system 122 and the media device 120 may both be in ON states, but the input to the media device 120 may be selected such that the media device 120 displays information from the broadcast source 104.

In the example of FIG. 1, the second of the two signals from the signal splitter 116 (i.e., the signal carried by connection 136 in FIG. 1) is coupled to an input of the metering unit 124. The metering unit 124 is a data logging and processing unit that may be used to generate viewing records and other viewing information useful for determining viewing and other metering information. The metering unit 124 typically collects a set of viewing records and transmits the collected viewing records over a connection 140 to a central office or data processing facility (not shown) for further processing and/or analysis. The connection 140 may be a telephone line, a return cable television connection, an RF connection, a satellite connection, an internet connection, etc.

The metering unit 124 may be configured to determine identifying information based on the signal corresponding to the program content being output by the STB 108. For example, the metering unit 124 may be configured to decode an embedded code in the signal received via connection 136 that corresponds to the channel or program currently being delivered by the STB 108 for display via the media device 120. The code may be embedded for purposes such as, for example, audience measurement, program delivery (e.g., PIDS in a digital television presentation, electronic program guide information, etc.) or delivery of other services (e.g., embedded hyperlinks to related programming, closed caption information, etc.). Alternatively or additionally, the metering unit 124 may be configured to generate a program signature (e.g., a proxy signal that is uniquely representative of the program signal) based on the signal received via connection 136 that corresponds to the program currently being delivered by the STB 108 for display via the media device 120. The metering unit 124 may then add this program identifying information (e.g., the code(s) and/or signature(s)) to the viewing records corresponding to the currently displayed program.

In the example metering system 100, the Naïve Bayes Module 128 is coupled to the metering unit 124. Additionally, the Naïve Bayes Module 128 is coupled to one or more sensors 144 that are also coupled to the metering unit 124. The sensors 144 may identify and relay information to the Naïve Bayes Module 128 based on the signal corresponding to the program content being output by the STB 108. The sensors 144 may include one or more sensors configured to monitor data carried by the connection 136 or processed within the metering unit 124 for audio signatures, video signatures, programming signatures, programming content, and/or any other type of information transmitted across the splitter 116 from the STB 108 to the media device 120.

The Naïve Bayes Module 128 of FIG. 1 includes a Naïve Bayes Classifier 150 to process data from the sensors 144 and 146 in order to determine the state of the media device 120.

The Naïve Bayes Classifier 150 includes an algorithm implementing Bayes' Theorem to independently process the outputs from the sensors 144 and 146, to calculate the probabilities of the media device 120 being in each possible state based on the outputs from the sensors 144 and 146, and to determine the state of the media device 120 by selecting the state with the highest probability of being active.

Information concerning the operating state of the media device 120 is transmitted from the Naïve Bayes Module 128 to the metering unit 124 so that the metering unit 124 can more accurately process the viewing information and viewing records. For example, in the media system 102, it is possible that the media device 120 is turned ON while the STB 108 may be inadvertently or intentionally left in an ON (active) state such that the STB 108 continues to receive and output program content provided by the broadcast source 104. Additionally, the gaming system 122 is turned ON. In this example, a panel member may be playing the gaming system 122 using the media device 120 as a display while the metering unit 124 is storing programming information from the STB 108. Without the Naïve Bayes Module 128 the metering unit 124 would indicate to a central office that television programming was viewed during the time period in which the gaming system 122 was actually used. The Naïve Bayes Module 128 corrects this information by using the data from the sensors 144 and 146 to correctly determine the media device 120 is in a gaming state and sends this information to the metering unit 124 so that the viewing records can be corrected.

The sensors 146 of FIG. 1 may be implemented by any combination of one or more of an audio sensor, a light sensor, a radio frequency sensor, an infrared sensor, a motion sensor, a vibration sensor, an angular rate sensor, an acceleration sensor, a pressure sensor, a voltage meter, a current meter, a power meter, a thermometer, a magnetic sensor, a chemical sensor, and/or any type of device for sensing electrical and/or mechanical properties of a media device. For example, an audio sensor is implemented by a microphone placed in the proximity of the media device 120 to receive audio signals corresponding to the program being presented. The Naïve Bayes Module 128 may then process the audio signals received from a microphone (e.g., implementing sensor(s) 144) to decode any embedded ancillary code(s) and/or generate one or more audio signatures corresponding to a program being presented. The Naïve Bayes Module 128 may also process the audio signal to determine if the media device 120 is in a state associated with emitting audio signals.

Additionally or alternatively, the sensors 146 may be implemented by an on-screen display detector for capturing images displayed via the media device 120 and processing regions of interest in the displayed image. The regions of interest may correspond, for example, to a broadcast channel associated with the currently displayed program, a broadcast time associated with the currently displayed program, a viewing time associated with the currently displayed program, etc. Furthermore, the sensors 146 may be implemented by a frequency detector to determine, for example, the channel to which the media device 120 is tuned. Additionally or alternatively, the sensors 146 could be implemented by an electromagnetic (EM) field pickup, a current sensor, and/or a temperature sensor configured to detect emissions from the media device 120 indicative of the media device 120 being in an active state. Additionally, the sensors 146 may include any variety of sensors 146 that may be coupled to the Naïve Bayes Module 128 to facilitate the determination of the state of the media device 120. Any or all of the sensors 146 may be located separate from and/or disposed in the Naïve Bayes Module 128 while any or all of the sensors 144 may be located separate from and/or embedded in the metering unit 124. Additionally or alternatively, any or all of the sensors 146 may be duplicated in the Naïve Bayes Module 128 to, for example, facilitate flexible placement of the various components of the local metering system 100 to permit metering of a wide range of media systems 102.

The metering unit 124 and the Naïve Bayes Module 128 may be implemented as separate devices or integrated in a single unit. Additionally or alternatively, any or all or the metering unit 124, the Naïve Bayes Module 128, or portions thereof may be integrated into the STB 108 and/or the media device 120. For example, Naïve Bayes Module 128 could be integrated into the STB 108 such that STB 108 is able to determine whether program content being received and output is also being presented by the monitored media device 120 or corresponding information presenting device. Such display device operating state information coupled with operating state information concerning the STB 108 itself, can be transmitted back to the broadcast provider responsible for the broadcast source 104 via a back-channel connection 168 to enable the broadcast provider to, for example, monitor consumption of program content output by the STB 108 and presented by the media device 120 in the absence of the metering unit 124.

In another example implementation, the Naïve Bayes Module 128, the metering unit 124, and sensors 144 and/or 146 may be embedded within the media device 120. In such an implementation, the media device 120 may include and/or be implemented as a cellular telephone, a laptop, and/or a PDA. In this example implementation, the Naïve Bayes Module 128 determines the state of the media device, where the state of the media device may be an application state such as, for example, a text messaging application, an audio application, or a calling application. In this case, the sensors 144 and/or 146 may be application adapters configured to gather information upon the activation of respective applications. The sensors 144 and/or 146 may be embedded within the software of the media device 120 or alternatively, may monitor communication busses or application specific integrated circuits for information regarding the activation and execution of the monitored applications.

While an example manner of implementing the metering system 100 is depicted in FIG. 1, one or more of the interfaces, data structures, elements, processes and/or devices illustrated in FIG. 1 may be combined, divided, rearranged, omitted, eliminated and/or implemented in any other way. For example, the example metering unit 124, the example sensors 144, the example sensors 146, the example Naïve Bayes Module 128, and/or the example Naïve Bayes Classifier 150 illustrated in FIG. 1 may be implemented separately and/or in any combination using, for example, machine accessible instructions executed by one or more computing devices and/or computing platforms (e.g., the example processing platform 1000 of FIG. 10). Further, the example metering unit 124, the example sensors 144, the example sensors 146, the example Naïve Bayes Module 128, the example Naïve Bayes Classifier 150, and/or, more generally, the metering system 100 may be implemented by hardware, software, firmware and/or any combination of hardware, software and/or firmware. Thus, for example, any of the example Naïve Bayes Module 128, the example Naïve Bayes Classifier 150, and/or more generally, the example metering system 100 can be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software or firmware implementation, at least one of the example metering unit 124, the example sensors 144, example sensors 146, the example Naïve Bayes Module 128, and/or the example Naïve Bayes Classifier 150 are hereby expressly defined to include a tangible medium such as a memory, DVD, CD, etc. storing such software or firmware. Further still, the example metering system 100 may include additional devices, servers, systems, networks, gateways, portals, and/or processors in addition to, or instead of, those illustrated in FIG. 1 and/or may include more than one of any or all of the illustrated devices, servers, networks, systems, gateways, portals, and/or processors.

Figure 2:
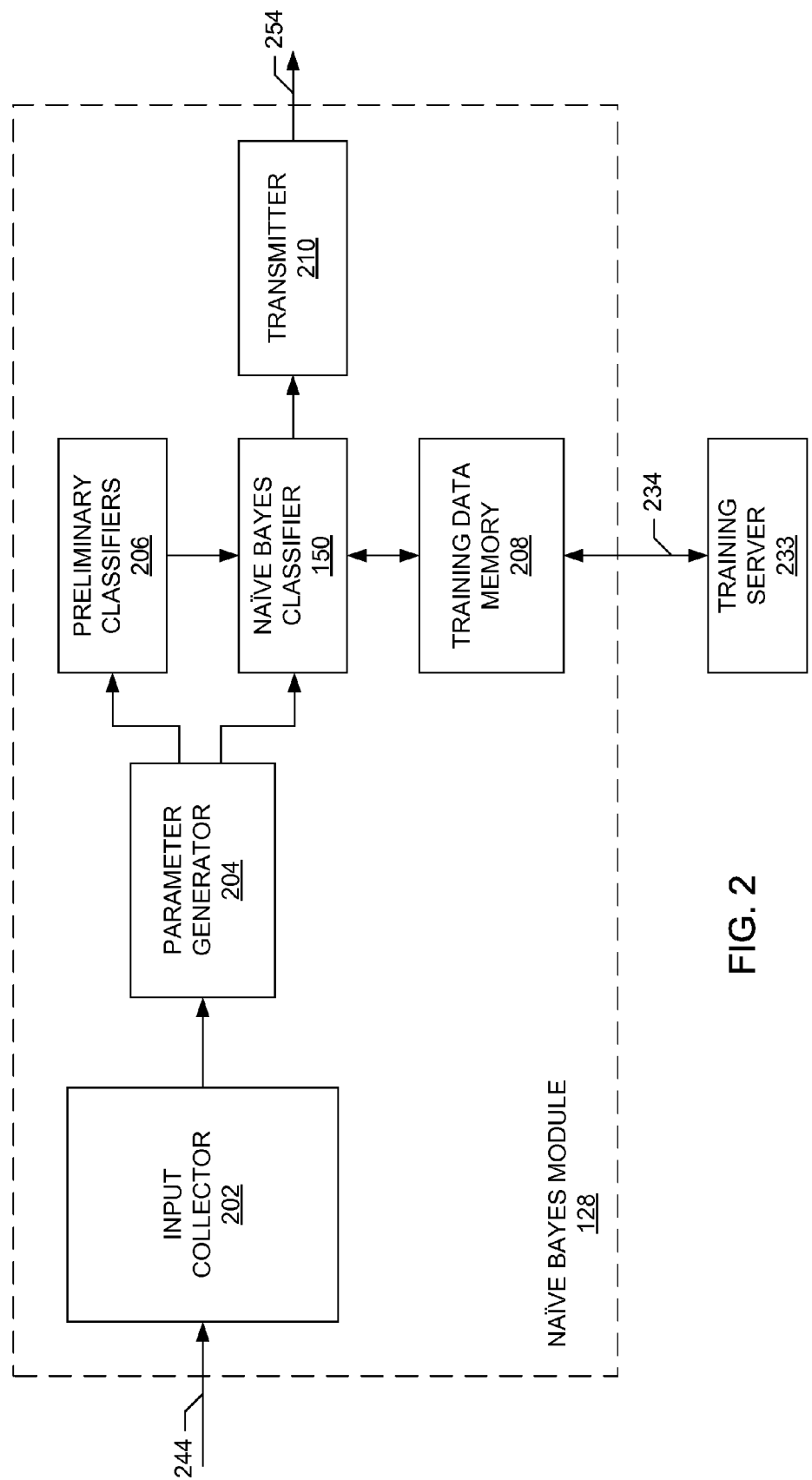
FIG. 2 is a block diagram showing the example Naïve Bayes Module of FIG. 1.

FIG. 2 is a block diagram showing the example Naïve Bayes Module 128 of FIG. 1 including an input collector 202, a parameter generator 204, preliminary classifiers 206, a training data memory 208, a transmitter 210, and the Naïve Bayes Classifier 150 of FIG. 1. The Naïve Bayes Module 128 receives sensor outputs via a connector or input 244 and transmits a state of a media device to the metering unit 124 of FIG. 1 via a connector or output 254. Additionally, the Naïve Bayes Module 128 communicates with a training server 233 during training via a communication path 234. The training communication occurs prior to deployment of the Naïve Bayes Module 128 to a household.

The input collector 202 receives sensor outputs from the sensors 144 and/or 146 of FIG. 1. While a single connector or input 244 is shown in FIG. 2, other implementations may include a connector or inputs for each sensor and/or a bus connector to two or more sensors. Alternatively, the connector or input 244 may be a wireless connector such as, for example, a Bluetooth™ wireless connection. The connector or input 244 may be any type of connection to communicatively couple the input collector 202 to the sensors 144 and/or 146.

The input collector 202 continually receives sensor outputs and samples the outputs periodically using a time period specified by the Naïve Bayes Classifier 150, the metering unit 124, a third party metering service, and/or a system designer (e.g., a person that designed the Naïve Bayes Module 128). For example, the input collector 202 receives inputs from an audio sensor, a video sensor, an RF sensor, and a light sensor. The sensors may output digital signals and/or analog signals at different intervals. The input collector 202 receives the outputs from the sensors and stores information associated with the sensor outputs until a specified time period has elapsed. Alternatively, a sample may be requested from the parameter generator 204 and/or the Naïve Bayes Classifier 150. The collection and storage of sensor outputs by the input collector 202 ensures the parameter generator 204 receives sensor outputs at the same time from all sensors monitoring a media device.

The input collector 202 of FIG. 2 may filter the sensor outputs for noise and/or any other type of electrical interference that masks or reduces the resolution of an electrical signal. The filter may include hardware such as, for example a bandpass filter for filtering audio output signals from a microphone or software filters such as, for example, a filter to extract certain digital bits regarding RF signal strength from a digital output from an RF sensor. Additionally, the input collector 202 may separate a single sensor output into two or more signals for the parameter generator 204. For example, the input collector 202 may receive an audio signal from a microphone via a single connection. The input collector 202 may then split the audio signal into three signals corresponding to audio gain, audio average energy, and audio signatures, each of which the parameter generator 204 may process individually. The splitting of the signal may occur before signal filtering or after signal filtering.

The parameter generator 204 receives sensor outputs via the input collector 202 and processes the sensor outputs to generate parameters for the preliminary classifiers 206 and/or the Naïve Bayes Classifier 150. The parameter generator 204 processes sensor outputs by converting the analog and/or digital signal(s) into digital value(s) interpretable by the Bayes algorithm in the Naïve Bayes Classifier 150 and/or by other algorithms in the preliminary classifiers 206. The processing may include converting an analog signal into a digital signal and then normalizing the digital signal. Additionally, the parameter generator 204 may receive a digital signal from the input collector 202, interrupt data bits within the digital signal and normalize the data within the digital signal.

The normalization of digital information creates consistency of input parameters for the Naïve Bayes Classifier 150. For example, audio gain may normally be expressed in decibels, current may be expressed in milliamps (mAs), while IR frequency may be expressed in kilohertz (kHz). The Naïve Bayes Classifier 150 is capable of independently processing the parameters with un-normalized data from multiple sensor outputs. However, the calculations are simplified when the data is normalized. Additionally, normalization reduces resolution of sensor outputs in cases where the sensor output may have a high resolution. However, the range of values for each state does not require the same high resolution. Resolution reduction via normalization may decrease processing time and/or load by processing data at lower resolutions. For example, a processer is capable of processing 6 bits of data faster than processing 12 bits representing the same data.

In an example implementation, a part of the parameter generator 204 is configured to process audio signals from the monitored media device 120 and detected by an audio sensor. The parameter generator 204 includes an analog-to-digital (A/D) converter to convert the audio signals to a digital format for processing. The parameter generator 204 also includes a variable gain amplifier (VGA) that may amplify or attenuate, as needed, the audio signals so that the audio signals appropriately fill the dynamic range of the A/D converter to yield a desired bit resolution at the output of the A/D converter.

The parameter generator 204 may be configured to control the gain/attenuation provided by the VGA based on any known automatic gain control (AGC) algorithm. For example, an AGC algorithm implemented by the parameter generator 204 may control the VGA to yield an output of the A/D converter having an amplitude, variance, standard deviation, energy, etc. within a predetermined range. The predetermined range is typically derived from the characteristics of the particular A/D converter to result in a gain/attenuation of the VGA that appropriately fills the dynamic range of the A/D converter.

The Naïve Bayes Module 128 of FIG. 2 includes a Naïve Bayes Classifier 150 to process parameters from the parameter generator 204 to determine the state of the media device 120. The Naïve Bayes Classifier 150 includes an algorithm implementing Bayes' Theorem to independently process the outputs from the sensors 144 and 146 to calculate the probabilities of the media device 120 being in each possible state based on the outputs from the sensors 144 and 146, and to determine the state of the media device 120 by selecting the state with the highest probability of being active.

The Naïve Bayes Classifier 150 is a probabilistic classifier based on applying Bayes' theorem with strong naïve independence assumptions. The Naïve Bayes Classifier 150 is capable of quickly processing a large number of variables independently with a high degree of classification accuracy.

The intrinsic nature of the Naïve Bayes Classifier 150 enables the determination of two or more states from one or more independent data sources. This enables the Naïve Bayes Classifier 150 to determine a state of a media device from a plurality of states and for a variety of different types of media devices and/or for different types of applications.

The accuracy of the Naïve Bayes Classifier 150 is due in part to the training of the Naïve Bayes Classifier 150 prior to implementation in a metering system. The training involves exposing the Naïve Bayes Classifier 150 to a training set of known media device states and recording sensor outputs corresponding to each state. In a training routine the state of the media device is sent to the Naïve Bayes Classifier 150 via the communication path 234. Additionally, the Naïve Bayes Classifier 150 receives processed and normalized sensor outputs as parameters from the parameter generator 204. The parameter values are processed by the Naïve Bayes Classifier 150 and noted for each media device state. This enables the Naïve Bayes Classifier 150 to formulate a range of parameter values and/or likely parameter values for each state. Furthermore, the Naïve Bayes Classifier 150 may assign weights to each range of parameter values for each media device state. In other example implementations the Naïve Bayes Classifier 150 may determine a relationship expressed as an equation to calculate a conditional probability and/or weight based on received parameter values.

The training routine determines a probability distribution of the conditional probabilities for each of the independent parameters for each media device state. The distribution may be partitioned into ranges of values corresponding to the frequency of certain parameter values. These conditional probabilities are used by the Naïve Bayes Classifier 150 to calculate the probability of a media device in each of its possible states in order to determine the state of the metered media device. Alternatively, the Naïve Bayes Classifier 150 may calculate weights for each of the independent parameters for each media device state. The calculated conditional probabilities or weights are stored by the Naïve Bayes Classifier 150 in the training data memory 208. In alternative implementations, an external server or processor may process the training set and store the training probabilities or odds in the training data memory 208 via the communication path 234. A training example for an example implementation of the Naïve Bayes Classifier 150 is shown in FIG. 4 and example training weights are shown in FIG. 5.

The training data memory 208 of FIG. 2 stores conditional probabilities and/or weights determined from a training routine. The stored conditional probabilities and/or weights are accessed by the Naïve Bayes Classifier 150 to determine the state of a media device. The training data memory may include a read-only memory (ROM), a random access memory (RAM), and/or any other type of memory. The RAM may be implemented by, for example, dynamic random-access memory (DRAM), synchronous dynamic random-access memory (SDRAM), and/or any other type of RAM device(s). The ROM may be implemented by, for example, flash memory(-ies) and/or any other desired type of memory device(s). Access to the training data memory may be controlled by a memory controller (not shown).

The Naïve Bayes Classifier 150 may calculate the state of a media device using any Naïve Bayes algorithm with Laplace smoothing that uses conditional probabilities and/or weights of independent parameters combined together to determine the probability and/or odds of a media device being in a state. Additionally, the Naïve Bayes Classifier 150 may use any Naïve Bayes algorithm to select the highest probability or greatest odds of all the calculated states to determine the most likely state of the media device.

In an example, the Naïve Bayes Classifier 150 implements Bayes' Theorem expressed below in equation (1). The example assumes a sample space, which is partitioned into a number of subspaces. In other words, the sample space is a media device and the number of subspaces is the total number of possible states in the media device. Each state is designated by $X_1$, where $X_1$ may be an ON state, $X_2$ may be an OFF state, $X_3$ may be a GAME state, $X_4$ may be a DVD state, etc. If the Naïve Bayes Module 128 monitors a media device in an unknown state with certain known sensor-measured parameters, which are in a sample space Y that includes the entire set of observed values for the parameters, the probability that the media device is in a particular state $X_i$ is given by equation (1):

$$P[X_i \mid Y] = \frac{P[Y \mid X_i] \cdot P[X_i]}{\sum_j P[Y \mid X_j] \cdot P[X_j]} \quad (1)$$

In this equation, the denominator is independent of the media device state and is expressed as the sum of the probabilities of the entire set of observed values Y. The numerator is calculated by multiplying the conditional probabilities of each sensor parameter for the entire set of observed values Y and the probability of the particular state Xi.

For example, three parameters are measured by sensors for a media device in a unknown state. To determine the probability of the state being the $X_3$ state, the conditional probabilities for the parameters given state $X_3$ are loaded from the training data memory 208 for the measured parameter values. If the conditional probability of the audio gain measured for state is 70%, the conditional probability of the average audio energy measured for the state is 30%, and the conditional probability of the visible light measured for state is 50%, then the numerator would be the product of the three probabilities and the probability of the state itself. Then, in this example, the probability the media device is in state $X_3$ is the product of the conditional probabilities divided by the probability of the entire known set Y. The example is repeated for the other states of the media device. Upon calculating the probability of all states, the Naïve Bayes Classifier 150 determines the media device state as the state with the greatest probability.

In another example implementation, equation (1) may be modified to calculate the natural logarithmic odds for each media state. In this example, the odds the media device is in a certain state are determined by taking the sum of the log of the conditional probabilities of all the parameters for one state, adding the log of the probability of the state itself, and subtracting the log of the probability of the entire known set Y. The state of the media device is then determined by the Naïve Bayes Classifier 150 as the state with the greatest logarithmic odds value. In yet other examples, the equation (1) may not divide by the entire set of observed values Y if Y is common for all possible media device states.

The Naïve Bayes Classifier 150 of FIG. 2 sends the determined state of a media device to the transmitter 210. The transmitter 210 then transmits the state of the media device to the metering unit 124 of FIG. 1. In other example implementations the transmitter 210 may send the state of a metered media device to central office or data processing facility for further processing or analysis. Furthermore, the transmitter 210 may send the media device state to a memory for storing the state of a media device in the Naïve Bayes Module 128.

The transmitter 210 may include any type of transmitting hardware and/or machine readable medium configured to send media device state information via any type of communication protocol to an appropriate receiver.

The Naïve Bayes Module 128 may include a single preliminary classifier 206 or multiple types of preliminary classifiers 206. Alternatively, in some cases, the Naïve Bayes Module 128 may not include the preliminary classifiers 206. The preliminary classifiers 206 implement algorithms used by the Naïve Bayes Module 128 to preprocess parameters from the parameter generator 204. The processed output from the preliminary classifiers 206 is sent to the Naïve Bayes Classifier 150. The preliminary classifiers 206 may include a fuzzy logic algorithm, a neural network algorithm, a decision tree algorithm, a rule indication algorithm, and/or an instance-based algorithm.

The preprocessing by the preliminary classifiers 206 may include a decision as to whether the media device is in a certain state and/or a confidence level indicating a media device is in a certain state. Additionally, the preprocessing by the preliminary classifiers 206 may provide better resolution of some parameter data. Furthermore, the preliminary classifiers 206 may be configured to process some types of interdependent and/or covariant parameter data. For example, a fuzzy logic algorithm used as preliminary classifier 206 may calculate a confidence of a media device state by processing parameter values for average audio gain and average audio energy together. The preliminary classifier 206 then processes the combined parameter value in the fuzzy logic decision based algorithm and outputs a confidence value or a normalized value indicating a media device state. The Naïve Bayes Classifier 150 then receives the output and processes the data independently with other parameters from the parameter generator.

While an example manner of implementing the Naïve Bayes Module 128 is depicted in FIG. 2, one or more of the interfaces, data structures, elements, processes and/or devices illustrated in FIG. 2 may be combined, divided, rearranged, omitted, eliminated and/or implemented in any other way. For example, the example input collector 202, the example parameter generator 204, the example preliminary classifiers 206, the example Naïve Bayes Classifier 150, and/or the example transmitter 210 illustrated in FIG. 2 may be implemented separately and/or in any combination using, for example, machine accessible instructions executed by one or more computing devices and/or computing platforms (e.g., the example processing platform 1000 of FIG. 10). Further, the example input collector 202, the example parameter generator 204, the example preliminary classifiers 206, the example Naïve Bayes Classifier 150, the example transmitter 210, and/or more generally, the Naïve Bayes Module 128 may be implemented by hardware, software, firmware and/or any combination of hardware, software and/or firmware. Thus, for example, any of the example input collector 202, the example parameter generator 204, example preliminary classifiers 206, the example Naïve Bayes Classifier 150, the example transmitter 210, and/or more generally, the Naïve Bayes Module 128 can be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software or firmware implementation, at least one of the example input collector 202, the example parameter generator 204, example preliminary classifiers 206, the example Naïve Bayes Classifier 150, and/or the example transmitter 210 are hereby expressly defined to include a tangible medium such as a memory, DVD, CD, etc. storing such software or firmware. Further still, the example Naïve Bayes Module 128 may include additional devices, servers, systems, networks, gateways, portals, and/or processors in addition to, or instead of, those illustrated in FIG. 2 and/or may include more than one of any or all of the illustrated devices, servers, networks, systems, gateways, portals, and/or processors.

Figure 3:
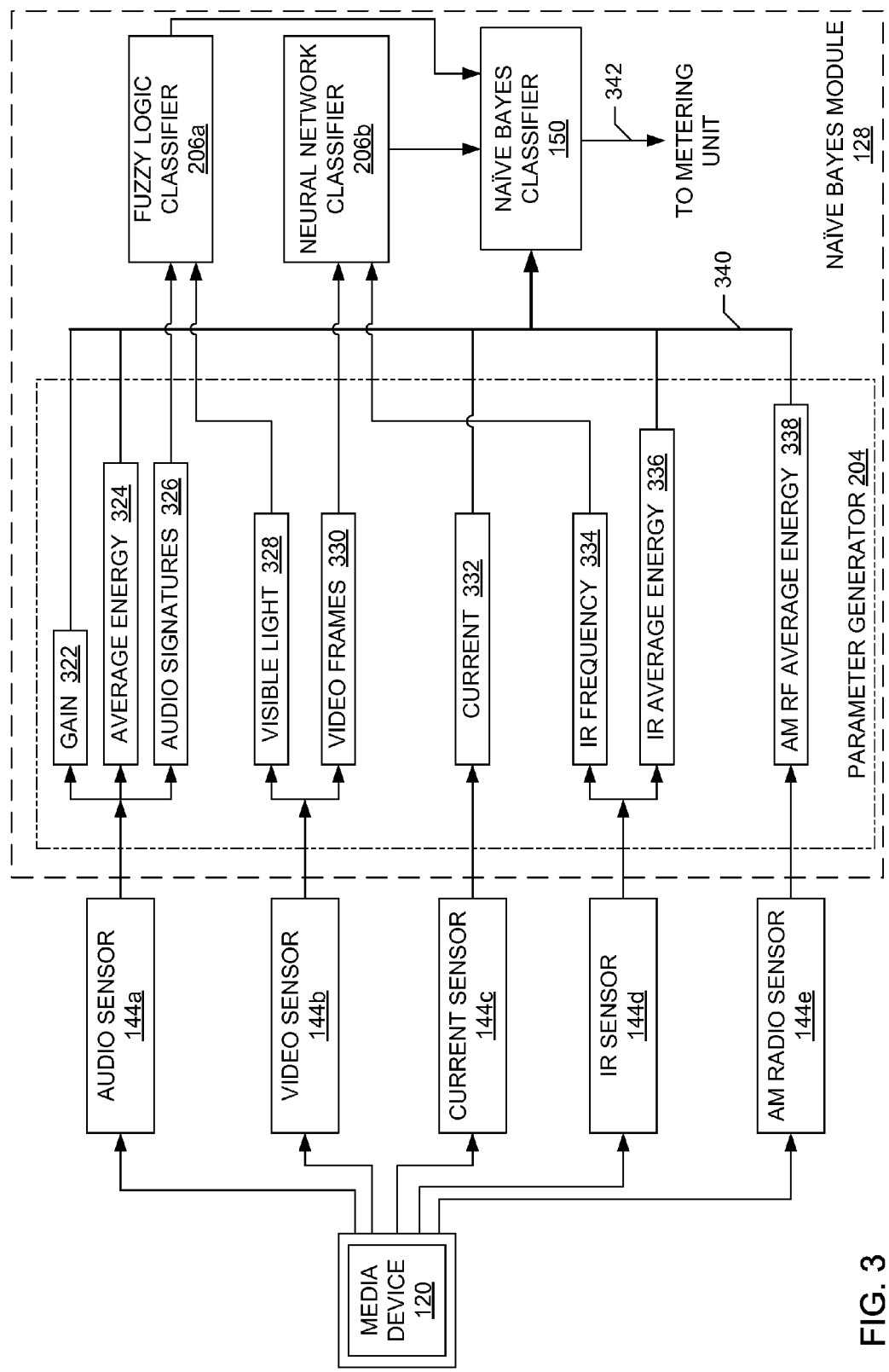
FIG. 3 is a block diagram showing an example implementation of the Naïve Bayes Module of FIG. 2 including sensors and parameters.

FIG. 3 is a block diagram showing an example of the Naïve Bayes Module 128 of FIG. 2 including the sensors 144 and parameters 322-338. In the example described herein, the Naïve Bayes Module 128 meters the state of the media device 120 of FIG. 1. The media device 120 may include any type of media device described in conjunction with the media device 120 in FIG. 1. Additionally, the parameter generator 204, the preliminary classifiers 206, and the Naïve Bayes Classifier 150 are similar or identical to the like numbered elements of FIG. 2. Specifically, the example shown in FIG. 3 includes an audio sensor 144a, a video sensor 144b, a current sensor 144c, an IR sensor 144d, and an AM radio sensor 144e. Furthermore, the preliminary classifiers 206 include a fuzzy logic classifier 206a and a neural network classifier 206b. The input collector 202, the transmitter 210, and the training data memory 208 from FIG. 2 are not shown.

The sensors 144 monitor certain electromagnetic properties corresponding to the media device 120 and convert these properties into electrical signals that are provided to the parameter generator 204. For example, the audio sensor 144a may be implemented as a microphone that transduces audio signals into corresponding electrical signals. The video sensor 144b may be implemented as a camera or light detection device that transduces light waves into corresponding electrical signals. The current sensor 144c may be implemented as a current measuring device coupled to a power cord of the media device 120 to measure amps of current and/or power drawn by the media device 120. The IR sensor 144d detects infrared energy emitted by the media device 120 and/or peripherals associated with the media device 120, and the AM radio sensor 144e transduces AM radio signals into corresponding electrical signals. The sensors 144 may transmit electrical information to the Naïve Bayes Module 128 via digital signals and/or analog signals. Additionally, the electrical information may be transmitted via a wireless connection or, alternatively, via a wired connection. In other examples, the sensors 144 may be embedded within the media device 120 and may utilize hardware and/or software within the media device 120.

The output properties received from the sensors 144 by the parameter generator 204 may be filtered for noise and/or any other types of electrical interference. The filters may include gain amplifiers, analog-to-digital converters, capacitors, and/or any other types of electrical component that may affect signal strength, signal quality, or information included within the signal. Some sensor outputs are then split into multiple connections for processing different types of parameter information.

For example, the output from the audio sensor 144a is split into three signals. The first signal is for determining the audio gain parameter 322, the second signal is for determining the average audio energy parameter 324, and the third signal is for determining the audio signatures parameter 326. The audio signal from the audio sensor 144a is divided into the three parameters 322-326 so that the parameter generator 204 can process the same audio signal from the audio sensor 144a differently. For example, the processing and calculation of values for the audio gain parameter is different from the calculation and processing of audio signatures. The gain parameter may be calculated by determining the decibel gain level of the analog audio signal while audio signatures are determined from certain patterns of the analog audio signal.

In the same manner, the video sensor 144b output signal is split into two signals used to determine the visible light parameter 328 and the video frames parameter 330, respectively. Likewise, the IR sensor 144d output is divided into two signals to determine the IR frequency parameter 334 and the IR average energy parameter 336. Upon splitting sensor output properties or signals, the parameter generator 204 calculates, processes, and normalizes the data into the parameter values. The parameter values are then transmitted from the parameter generator 204 to either the preliminary classifiers 206 or the Naïve Bayes Classifier 150. In the example of FIG. 3, the audio signature parameter 326 and the visible light parameter 328 are sent to the fuzzy logic classifier 206a, and the video frames parameter 330 and the IR frequency parameter are sent to the neural network classifier 206b. The gain parameter 322, the average audio energy parameter 324, the current parameter 332, the IR average energy parameter 336, and the AM RF average energy parameter 338 are conveyed via a bus 340 directly to the Naïve Bayes Classifier 150.

The fuzzy logic classifier 206a of FIG. 3 processes the audio signature parameter 326 values and the visible light parameter 328 values via a fuzzy logic algorithm. For example, the fuzzy logic algorithm may use linguistic processors to calculate a value from digital information within the audio signature parameter 326 value and combine that information with the visible light parameter 328 value. In other words, audio signatures determined from the audio signal such as, for example key words, names, phrases, and/or noises emitted from the media device 120 may be processed by the fuzzy logic algorithm to determine a processed value corresponding to a state of the media device. Phrases common to commercials may indicate the media device is in a television state while the lack of commercials may indicate a gaming state or a movie watching state. This value is then combined with the visible light parameter 328 value. The combined value processed by the fuzzy logic algorithm may indicate if the media device 120 is in a television state, a game playing state, or a DVD playing state. Upon processing the parameter values 326 and 328, the fuzzy logic classifier 206a sends an output parameter value to the Naïve Bayes Classifier 150. The output parameter value may be a normalized numerical value or may be any other digital and/or analog type value capable of being processed by the Naïve Bayes Classifier 150.

The neural network classifier 206b processes the video frames parameter 330 value and the IR frequency parameter 334 value via a neural network algorithm. For example, the neural network algorithm may be arranged in a cascading formation such that video frame information may be processed based on the types of information within the video images. The video image information may be combined with IR frequency information to determine information about the state of the media device.

The video images may be processed through the neural network such that the video images are partitioned into different sections. Then, the neural network algorithm matches the different sections of the video images to certain neural network functions represented as image clips. As certain video sections match image clips more video sections are compared to additional clips. The progression of matching images may be specified by the cascading nature of the neural network. A value is determined from the number of matching video image sections to image clips. For example, certain video sections may correspond to images from a video game.

The neural network classifier 206b matches the video sections to image clips and determines a confidence value of the monitored media device in a gaming state. Furthermore, the IR frequency may be processed through the neural network and combined with the processed video clip value. This combined output parameter value is then transmitted to the Naïve Bayes Classifier 150. The output parameter value may be a normalized numerical value or, alternatively, any other digital and/or analog type value capable of being processed by the Naïve Bayes Classifier 150.

The Naïve Bayes Classifier 150 of FIG. 2 receives parameters from preliminary classifiers 206 and/or the parameter generator 204 via the bus 340. The Naïve Bayes Classifier 150 calculates the state of a media device using any Naïve Bayes algorithm with Laplace smoothing that uses conditional probabilities and/or weights of independent parameters combined together to determine the probability and/or odds of a media device being in a state. Additionally, the Naïve Bayes Classifier 150 may use any Naïve Bayes algorithm to select the highest probability or greatest odds of all the calculated states to determine the most likely state of the media device.

For each parameter value received by the Naïve Bayes Classifier 150, the Naïve Bayes Classifier 150 loads the conditional probabilities for each possible state for each parameter value. For example, if the Naïve Bayes Classifier 150 receives an audio gain parameter 322 value of 5.6 measured for a media device with three possible states, ON, OFF, and GAMING. The 5.6 value corresponds to a 45% conditional probability for the state ON, a 57% conditional probability for the state GAMING, and a 22% conditional probability for the state OFF. The Naïve Bayes Classifier 150 then calculates the probability for each of the three states (e.g., ON, OFF, and GAMING) by combining all of the conditional probabilities for the ON state for all of the parameters 322-338, then combining all of the conditional probabilities for the OFF state for all of the parameters 322-338, and finally combining all of the conditional probabilities for the GAMING state for all of the parameters 322-338. A description of the calculations for combining the conditional probabilities is described above in conjunction with FIG. 2.

Upon calculating the probabilities for each state, the Naïve Bayes Classifier 150 of FIG. 3 selects the media device state corresponding to the greatest probability. The Naïve Bayes Classifier 150 then sends the media device state via output 342 to the metering unit 124 of FIG. 1. In other example implementations, the Naïve Bayes Classifier 150 may send the media device state to a third party collecting media device information, and/or to a memory for storing media device information.

FIG. 4 shows a table including an example training set or data 400 for the example Naïve Bayes Module 128 of FIG. 2. The training set 400 includes the parameters 322-338 of FIG. 3 and a parameter for the state of the media device (i.e., STATE). The first ten rows of the training set 400 correspond to recorded parameter values for a media device in an OFF state, the next ten rows correspond to parameter values for a media device in a television mode (i.e., TV ON), and the last ten rows correspond to parameter values for a media device in a gaming state (i.e., GAME ON). The parameter values may differ for a media device in one state due to the different possible levels of the state. For example, a media device in an ON state may have different volume settings, different contrast settings, etc. For simplicity and brevity, the example of FIG. 4 includes parameter values normalized to a value between 0.0-2.0 and the example does not include preliminary classifiers. In other examples, the parameters may include any analog or digital numerical values, any normalized or non-normalized values, and/or outputs from one or more preliminary classifiers.

The training set 400 of FIG. 4 may be determined by placing a training media device in one of the three states and recording the parameters from sensors monitoring the media device. The known state of the media device is then associated with the parameter values associated with the state. In this case, the media device may be representative of a media device in a household the Naïve Bayes Module 128 is to meter with training sensors representative of sensors used to record electrical outputs from the media device.

In other examples, the training set 400 may represent simulated parameter values and the corresponding media device states. The simulated parameters may be determined from a collection of parameter values collected by one or more metering units and/or Naïve Bayes Modules 128, or by calculations of sensor outputs for different media device states. For the simulated parameter values, the training set 400 is processed in the same manner as if the parameter values were from sensors monitoring a media device.

FIG. 5 is a table 500 showing trained weights for the example Naïve Bayes Module 128 of FIG. 2 derived from the training set 400 of FIG. 4. The parameters 322-338 are shown with normalized ranges of parameter values for each media device state. For simplicity and brevity the normalized values for each parameter are organized into three ranges (i.e., 0.0, 1.0, and 2.0). In other examples, different parameters may have a different number of ranges, with each range for different amounts of values.

The table 500 is calculated from the training set 400 of FIG. 4 by counting the number of instances of each parameter value for each parameter in each media device state. For example, the gain parameter and the OFF state has two instances of 0.0, eight instances of 1.0, and zero instances of 2.0 in the training set 400. The last row, TOTAL INSTANCES, shows the total number of training instances for each media device state. The Naïve Bayes Classifier 150 may process the training set 400 to generate the table 500. Alternatively, a server and/or computer external to the Naïve Bayes Module 128 may process the training set 400 to generate the table 500. The table 500 is stored in the training data memory 208 of FIG. 2.

The numbers of instances are reflected as weights in table 500. In some examples, the number of instances may be divided by the total number of possible instances for a media device state (e.g., 10) to calculate a conditional probability. Thus, the weight of 2 in the OFF state of the 0.0 gain parameter value has a conditional probability value of 20%. In yet other examples, the weights and/or conditional probabilities may be expressed as an equation of the parameter value. For example, the OFF state conditional probability of visible light may be equated to $(25x^2-10x)/100$, where x is the visible light parameter value. Thus, if x is 2, then the conditional probability is 80%.

The Naïve Bayes Classifier 150 uses the instances shown in the table 500 to calculate the media device state probabilities. The instances represent the likelihood a media device is in a certain state based on a parameter. For example, the Naïve Bayes Classifier 150 receives a gain parameter value of 1.0. The Naïve Bayes Classifier 150 uses the corresponding weight of 8 to calculate the probability of the media device being in the OFF state, the weight of 3 to calculate the probability of the media device being in the TV ON state, and the weight of 6 to calculate the probability of the media device being in the GAME state. The weights may be converted into conditional probabilities by dividing each weight by the total number of possible instances for the media device state (e.g., 10). Thus, there is an 80% probability of a gain parameter value of 1.0 if the media device is in an OFF state, a 30% probability of a gain parameter value of 1.0 if the media device is in a TV ON state, and a 60% probability of a gain parameter value of 1.0 if the media device is in a GAME state.

In other examples, the Naïve Bayes Classifier 150 may use Laplace smoothing to avoid calculating the probability of the state of a media device using conditional probabilities with a value of 0%. In some algorithms a 0% conditional probability value may decrease the accuracy of the calculations. In an example of Laplace smoothing, a gain parameter value of 0.0 corresponds to a weight of 0 for the TV ON state. The Naïve Bayes Classifier 150 may use Laplace smoothing for calculating the conditional probability for the TV ON state given a 0.0 gain parameter value. Instead of dividing the weight by the total number of instances (e.g., 10), the conditional probability is calculated by adding a value of 1 to the weight then dividing by the total number of instances plus the total number of possible states (e.g., 3). As a result, the conditional probability is 7.7%, instead of 0% without Laplace smoothing. Likewise, conditional probabilities may be calculated for the other weights shown in table 500 using Laplace smoothing regardless of the value of the weight. In the prior example, the weight of 8 may be converted to a conditional probability of 69% using Laplace smoothing. In yet other examples, the conditional probability may be calculated by adding a value of 1 to the weight, then dividing the weight by the total number of instances or dividing the weight by the total number of instances plus a value.

Figure 6:
FIG. 6 is a table showing example parameter values from sensors monitoring a media device and a calculated state of the media device.

FIG. 6 is a table 600 showing example parameter values from sensors monitoring a media device, corresponding weights from the table 500 of FIG. 5, and calculated probabilities of the state of the media device. Table 600 shows an example calculation of media device states based on an example set of parameters. In the example of FIG. 6, normalized parameter values are shown as example inputs for the Naïve Bayes Classifier 150.

In the example, the parameter generator 204 sends the Naïve Bayes Classifier 150 a gain parameter value of 0.0, an average audio energy parameter value of 2.0, an audio signature parameter value of 2.0, a visible light parameter value of 2.0, a video frame parameter value of 2.0, a current parameter value of 1.0, an IR average energy parameter value of 2.0, an IR frequency parameter value of 2.0, and an AM average energy parameter value of 2.0. The Naïve Bayes Classifier 150 accesses the weights and/or conditional probabilities in the table 500 associated with these parameter values. The values are shown for each state for the parameter types in table 600. The Naïve Bayes Classifier 150 then combines the independent parameter values to determine a media state confidence. The confidence value is calculated by converting the weights to conditional probabilities and multiplying together the conditional probabilities for each of the parameter types for each state of the media device. Then, the natural log is calculated from the resultant of the multiplied conditional probabilities and from the log of the probability of the state itself resulting in the confidence value shown in the table 600. The natural log is used to show the confidence probability as a base rather than a very small decimal value. However, in other examples, the Naïve Bayes Classifier 150 may determine the state of the media device using the decimal value of the confidence values.

The table 600 in FIG. 6 shows that the OFF state has the greatest media state confidence value. The Naïve Bayes Classifier 150 then transmits information including that the metered media device is in an OFF state. In other example implementations, the Naïve Bayes Classifier 150 may calculate the probability of each state and select the state with the greatest probability. In other examples, the table 600 may include conditional probabilities instead of the parameter weights, where the conditional probabilities may be calculated using Laplace smoothing.

Figure 7:
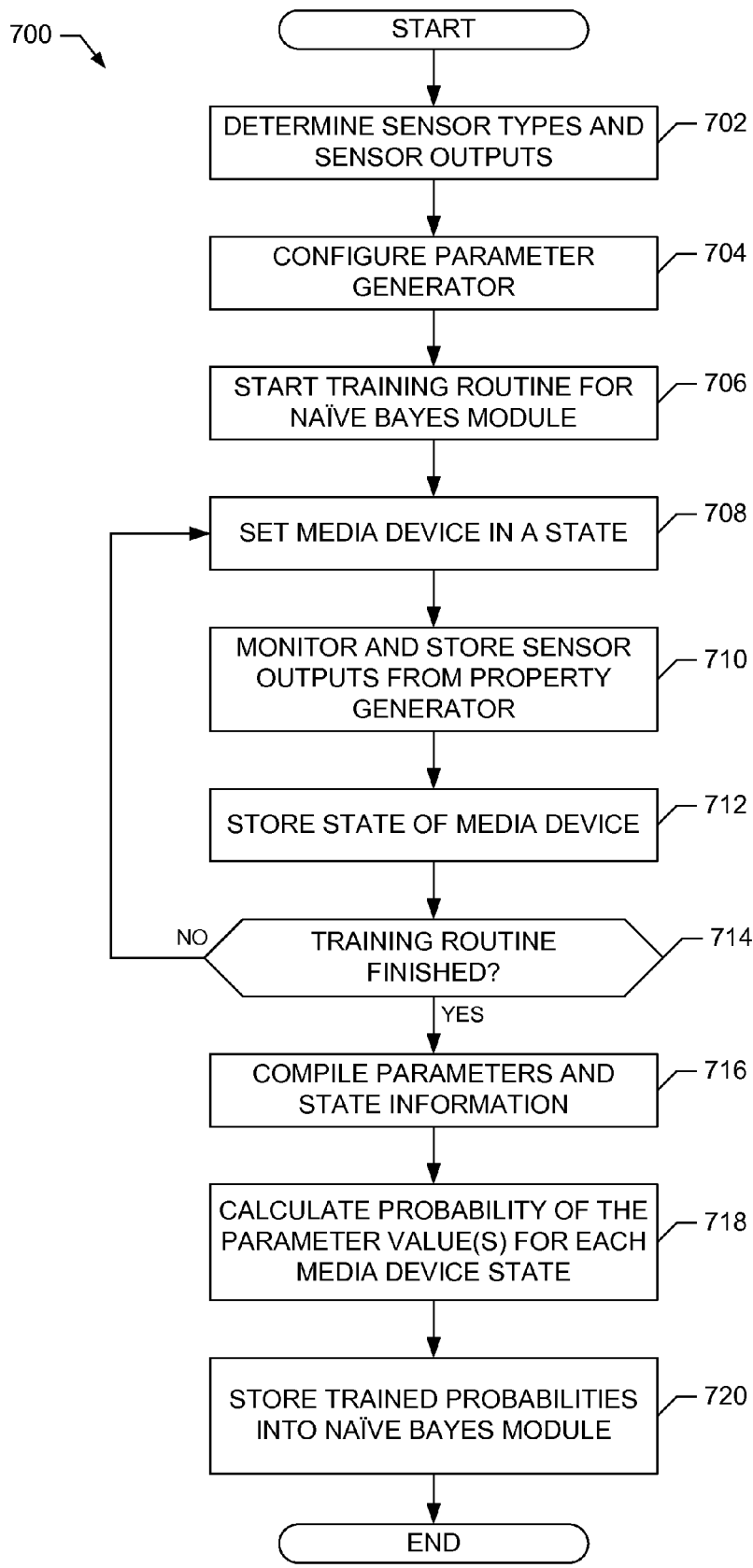
FIG. 7 is a flowchart representative of an example process that may be performed by, for example, a processor to implement a training routine for the example Nave Bayes Module of FIG. 2.
Figure 8:
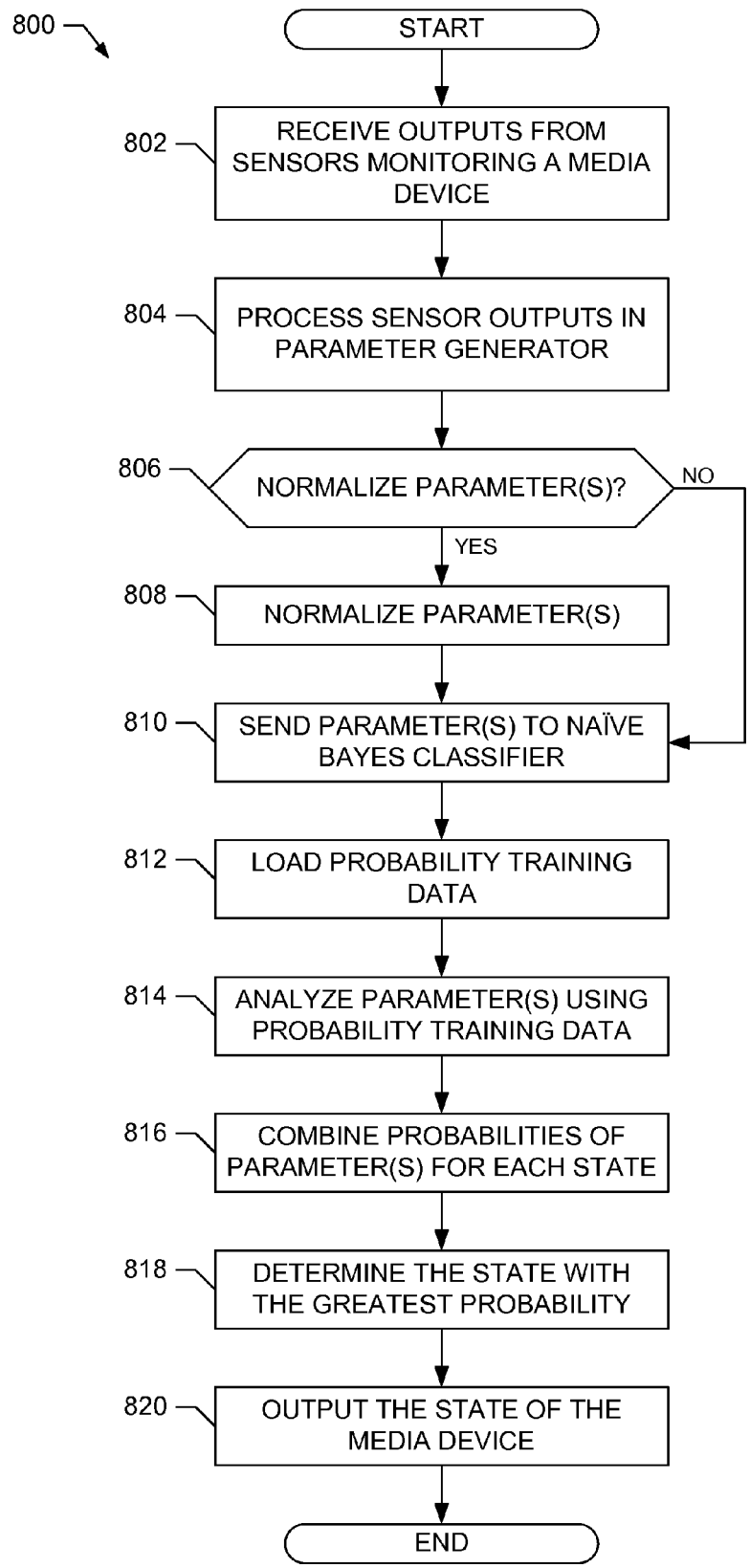
FIGS. 8 and 9 are flowcharts representative of example process that may be performed by, for example, a processor to implement any portion or all of the example Nave Bayes Module of FIG. 2.
Figure 9:
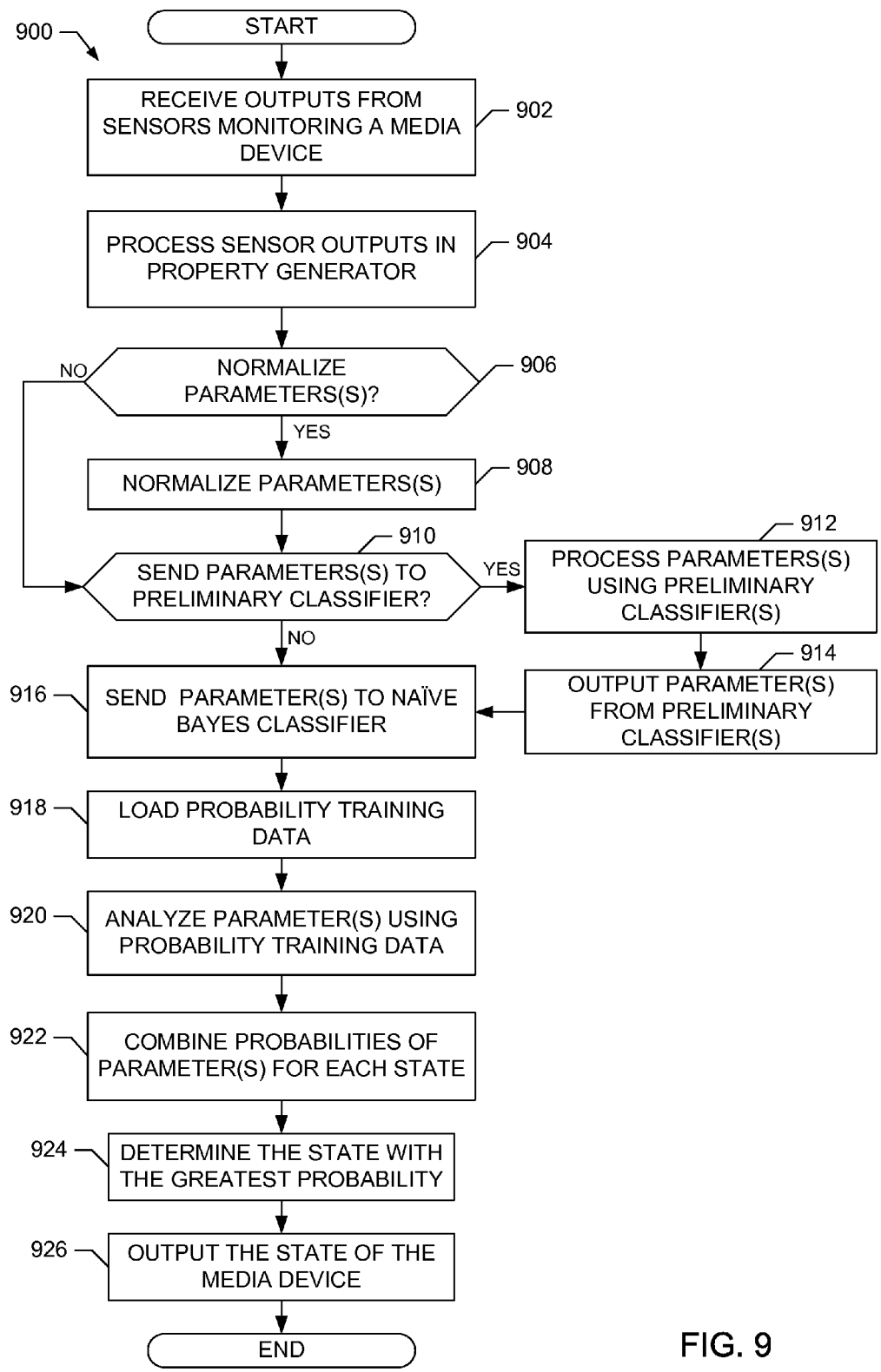

FIGS. 7, 8, and 9 are flowcharts representative of example processes that may be performed to determine the state of a media device. The example processes may be implemented as machine readable instructions executed using, for example, a processor system such as the system 1000 of FIG. 10. However, one or more of the blocks depicted in the flowcharts may be implemented in any other manner, including by dedicated purpose circuitry, manual operations, etc. Additionally, although the example processes are described with reference to the flowcharts of FIGS. 7, 8, and 9, other methods to determine the state of a media device may additionally or alternatively be used. For example, the order of execution of the blocks depicted in the flowcharts of FIGS. 7, 8, and 9 may be changed, and/or some of the blocks described may be rearranged, eliminated, or combined.

The example process 700 represented by FIG. 7 may be performed to implement the example Naïve Bayes Module 128 and/or the example Naïve Bayes Classifier 150 of FIGS. 1 and 2. The example process 700 may be executed at predetermined intervals, based on an occurrence of a predetermined event, in response to a user request, etc., or on any combination thereof. For example, the process 700 may be executed at predetermined intervals, such as hourly, daily, etc. Additionally or alternatively, the example process 700 may be executed upon the occurrence of a trigger generated remotely such as, for example, a third party monitoring company preparing the Naïve Bayes Module 128 for deployment in a household by initiating a training routine.

The example process 700 of FIG. 7 shows a training routine for the Naïve Bayes Module 128 of FIGS. 1 and 2 and begins with the determination of the number and types of sensors for monitoring a media device (block 702). Additionally, the types of outputs for each sensor are determined Next, the parameter generator 204 within the Naïve Bayes Modules 128 is configured for the corresponding sensor output types (block 704). The parameter generator 204 is configured so that sensor outputs are converted into the specified digital format and so that the parameter generator 204 routes the resulting parameters to a specified preliminary classifier or the Naïve Bayes Classifier 150.

The example process 700 continues when the training routine is initiated for the Naïve Bayes Module (block 706). The training routine starts by setting a training media device in a first state (block 708). The training media device is representative of the types of media devices the Naïve Bayes Module 128 will meter in a household. Upon setting the training media device into the first state, the Naïve Bayes Module 128 monitors and stores the parameters converted from the sensor outputs by the parameter generator 204 (block 710). The parameters include all parameter types output by the parameter generator 204. The parameter values for the first state are stored as a first set of data. Then, the first state of the media device is stored (block 712). The parameters and media device state may be stored within the Naïve Bayes Module 128 or, alternatively, the media device state and parameters may be stored on an external server.

Next, a check is performed to determine if the training routine is finished (block 714). If the training routine is not finished, control returns to block 708 where the media device is placed into another state. The media device may be placed into the first state again or the state may be changed to any one of the other possible states of the media device. If the training routine is finished, the external server and/or the Naïve Bayes Module 128 compiles the stored parameters and corresponding media device states (block 716). Then, the Naïve Bayes Module 128 and/or the external sever calculates the conditional probabilities (and/or weights) for the parameter values for each media device state (block 718). The conditional probabilities are calculated by distributing the parameter values for each parameter type and media device state. Different portions of the distribution are assigned probabilities based on the number instances of a parameter value for a media device state with consideration to the total number of instances.

For example, a training routine may include 10 instances of a media device in a game state. A trained parameter includes a normalized audio gain parameter with a potential range of values between 0 and 10. In the training routine, the audio gain parameter has zero instances between values of 0 to 3, seven instances of values between 3 to 5, two instances of values between 5 to 7 and one instance of a value between 7 and 10. The conditional probability is the number of instances of a range divided by the total number of instances. Thus, the normalized audio gain for the range 3 to 5 has a conditional probability of 70% (e.g., seven instances out of ten possible instances). In other words, if the Naïve Bayes Classifier 150 receives an average audio gain between 3 and 5, the conditional probability is 70%, which is used to calculate the total probability of the media device in the game state.

In other example implementations the distribution may be split by smaller numerical ranges, by larger numerical ranges, or by single values. In yet other example implementations the server and/or the Naïve Bayes Module 128 may determine an equation relating parameter values to conditional probabilities. The example process 700 ends when the trained conditional probabilities (and/or weights) or equations for calculating conditional probabilities from parameter values are stored into the training data memory 208 of the Naïve Bayes Module 128.

The example process 800 represented by FIG. 8 may be performed to implement the example Naïve Bayes Module 128 and/or the example Naïve Bayes Classifier 150 of FIGS. 1 and 2. The example process 800 may be executed at predetermined intervals, based on an occurrence of a predetermined event, in response to a user request, etc., or on any combination thereof. For example, the process 800 may be executed at predetermined intervals, such as hourly, daily, etc. Additionally or alternatively, the example process 800 may be executed upon the occurrence of a trigger generated remotely such as, for example, the activation of the Naïve Bayes Module 128 to monitor a media device.

The example process 800 of FIG. 8 begins when the Naïve Bayes Module 128, coupled to a metering unit monitoring a media device, receives outputs from sensors monitoring the media device (block 802). Upon receiving the sensor outputs, the parameter generator 204 processes the outputs by filtering, attenuating, splitting, and/or converting the output properties into parameters (block 804). Next, the parameter generator 204 determines if any of the parameter values are to be normalized (block 806). For the parameters that are specified to be normalized, the parameter generator 204 normalizes those parameters (block 808). The normalization standardizes the numerical information for the Naïve Bayes Classifier 150. For example, IR frequency expressed in megahertz and audio gain expressed in decibels can both be normalized for a linear numerical range from 0 to 10. Upon normalizing the parameters, the parameter generator 204 sends the parameter values to the Naïve Bayes Classifier 150 (block 810). Furthermore, for parameters that are not specified to be normalized, the parameter generator sends the parameter values to the Naïve Bayes Classifier 150 (block 810).

The example process continues 800 when the Naïve Bayes Classifier 150 loads the training data of conditional probabilities and/or weights from the training data memory (block 812). Next, the Naïve Bayes Classifier 150 analyzes the parameter values and matches the corresponding conditional probabilities for each media device state to each parameter value (block 814). Then, for each possible state of the media device, the conditional probabilities for each parameter are calculated resulting in probabilities for each media device state (block 816). The calculation may include using equation (1) described in conjunction with FIG. 2 or a sum of logarithmic conditional probabilities of each parameter value. Next, the Naïve Bayes Classifier 150 selects the state with the highest probability and/or the greatest log odds (block 818). Then, the example process ends when the Naïve Bayes Module 128 outputs the state of the media device (block 820).

The example process 900 represented by FIG. 9 may be performed to implement the example Naïve Bayes Module 128 and/or the example Naïve Bayes Classifier 150 of FIGS. 1 and 2. The example process 900 may be executed at predetermined intervals, based on an occurrence of a predetermined event, in response to a user request, etc., or on any combination thereof. For example, the process 900 may be executed at predetermined intervals, such as hourly, daily, etc. Additionally or alternatively, the example process 900 may be executed upon the occurrence of a trigger generated remotely such as, for example, the activation of the Naïve Bayes Module 128 to monitor a media device.

The example process 900 of FIG. 9 begins when the Naïve Bayes Module 128, coupled to a metering unit monitoring a media device, receives outputs from sensors monitoring the media device (block 902). Upon receiving the sensor outputs, the parameter generator 204 processes the outputs by filtering, attenuating, splitting, and/or converting the output properties into parameters (block 904). Next, the parameter generator 204 determines if any of the parameter values are to be normalized (block 906). For the parameters that are to be normalized, the parameter generator 204 normalizes those parameters (block 908). The normalization standardizes the numerical information for the Naïve Bayes Classifier 150. Upon normalizing the parameter values, the parameter generator 204 determines if any of the parameters are to be sent to a preliminary classifier (block 910). Furthermore, for parameters that are not specified to be normalized, the parameter generator determines if any of the parameters are to be sent to a preliminary classifier (block 910).

If one or more parameter values are to be sent to a preliminary classifier, the example process 900 sends the one or more parameter values to the appropriate preliminary classifier (block 910). The Naïve Bayes Module 128 may include one or more preliminary classifiers with some parameters sent to a first preliminary classifier, some parameters sent to a second preliminary classifier, and/or some parameters not sent to a preliminary classifier. Additionally, some parameters may be sent to more than one preliminary classifier. The parameters not sent to a preliminary classifier are transmitted to the Naïve Bayers Classifier 150 (block 916). For the parameters sent to preliminary classifiers, the example process 900 processes the parameter values by the algorithm type in each preliminary classifier (block 912). For example, parameters sent to a fuzzy logic preliminary classifier are processed via a fuzzy logic algorithm to determine a characteristic from one or more combined parameters about the media device. Upon processing parameter values, the preliminary classifiers output parameter values (block 914) and send the outputted parameter values to the Naïve Bayes Classifier 150 (block 916).

The example process continues 900 when the Naïve Bayes Classifier 150 loads the training data of conditional probabilities and/or weights from the training data memory (block 918). Next, the Naïve Bayes Classifier 150 analyzes the parameter values and matches the corresponding conditional probabilities for each media device state to each parameter value (block 920). Then, for each possible state of the media device, the conditional probabilities for each parameter are calculated resulting in probabilities for each media device state (block 922). The calculation may include using equation (1) described in conjunction with FIG. 2 or a sum of logarithmic conditional probabilities of each parameter value. Next, the Naïve Bayes Classifier 150 selects the state with the highest probability and/or the greatest log odds (block 924). Then, the example process ends when the Naïve Bayes Module 128 outputs the state of the media device (block 926).

Figure 10:
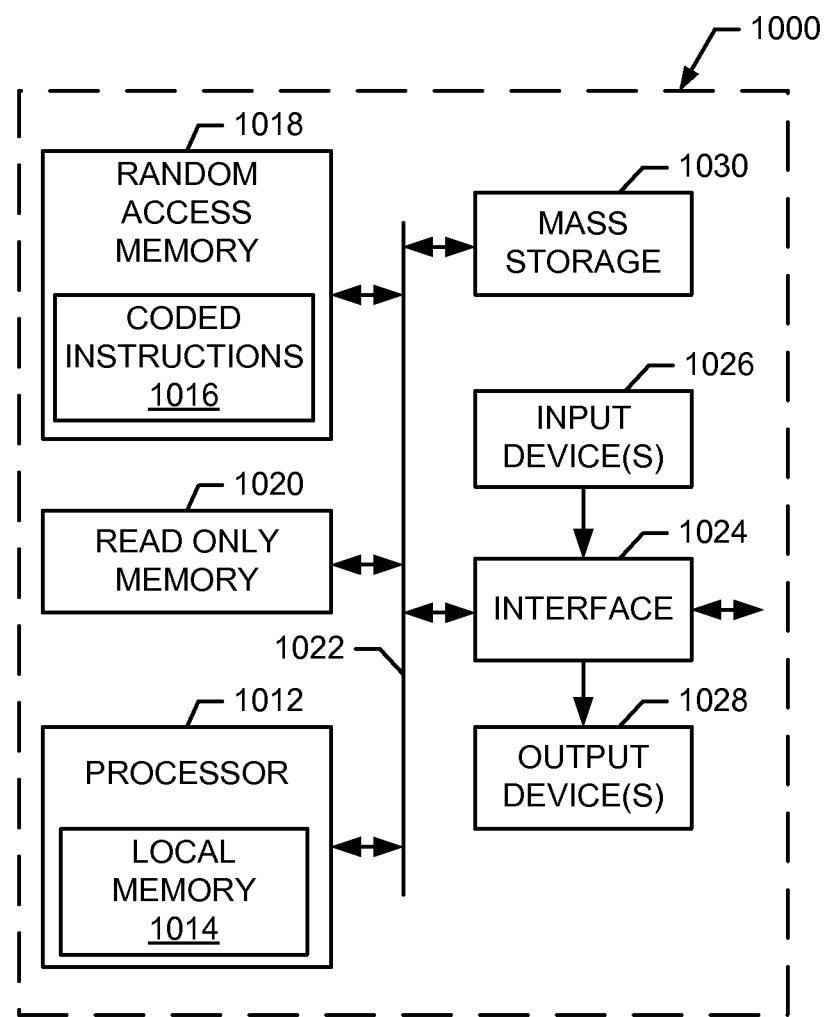
FIG. 10 is a schematic illustration of an example processor platform that may be used and/or programmed to implement the example Naïve Bayes Module of FIG. 2 and/or to use a Naïve Bayes algorithm to determine the state of media devices and/or the example process of FIGS. 7, 8, and/or 9 to implement any or all of the example system and methods described herein.

FIG. 10 is a block diagram of an example computer system 1000 capable of implementing the apparatus and methods disclosed herein. The computer 1000 can be, for example, a server, a personal computer, a personal digital assistant (PDA), an internet appliance, a DVD player, a CD player, a digital video recorder, a personal video recorder, a set top box, or any other type of computing device. Any or all of the example Naïve Bayes Module 128, the example Naïve Bayes Classifier 150, the example input collector 202, and/or the example parameter generator 204 may be implemented by the example computer 1000.

The system 1000 of the illustrated example includes a processor 1012 such as a general purpose programmable processor. The processor 1012 includes a local memory 1014, and executes coded instructions 1016 present in the local memory 1014 and/or in another memory device. The coded instructions 1016 may include some or all of the instructions implementing the processes represented in FIGS. 7, 8, and 9. The processor 1012 may be any type of processing unit, such as one or more microprocessors from the Intel® Centrino® family of microprocessors, the Intel® Pentium® family of microprocessors, the Intel® Itanium® family of microprocessors, the Intel® Core® family of microprocessors, and/or the Intel® XScale® family of processors. Of course, other processors from other families are also appropriate.

The processor 1012 is in communication with a main memory including a volatile memory 1018 and a non-volatile memory 1020 via a bus 1022. The volatile memory 1018 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory 1018, 1020 is typically controlled by a memory controller.

The computer 1000 also includes an interface circuit 1024. The interface circuit 1024 may be implemented by any type of interface standard, such as an Ethernet interface, a universal serial bus (USB), and/or a third generation input/output (3GIO) interface.

One or more input devices 1026 are connected to the interface circuit 1024. The input device(s) 1026 permit a user to enter data and commands into the processor 1012. The input device(s) can be implemented by, for example, a keyboard, a mouse, a touchscreen, a track-pad, a trackball, an isopoint and/or a voice recognition system.

One or more output devices 1028 are also connected to the interface circuit 1024. The output devices 1028 can be implemented, for example, by display devices (e.g., a liquid crystal display, a cathode ray tube display (CRT)), by a printer and/or by speakers. The interface circuit 1024, thus, typically includes a graphics driver card.

The interface circuit 1024 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1000 also includes one or more mass storage devices 1030 for storing software and data. Examples of such mass storage devices 1030 include floppy disk drives, hard drive disks, compact disk drives and digital versatile disk (DVD) drives. The mass storage devices 1030 may implement any or all of the training data memory 208. Additionally or alternatively, the volatile memory 1018 may implement any or all of the example training data memory 208.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and apparatus described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method, comprising:
generating, based on a first output signal from a first sensor, a first parameter value representative of a first property of a media device;
generating, based on a second output signal from a second sensor, a second parameter value representative of a second property of the media device;
calculating a first state probability that the media device is presenting media provided by a first source based on a first conditional probability associated with the first parameter value and a second conditional probability associated with the second parameter value;
calculating a second state probability that the media device is presenting media provided by a second source different than the first source based on a third conditional probability associated with the first parameter value and a fourth conditional probability associated with the second parameter value; and
generating a state identifier by comparing the first state probability and the second state probability.

2. A method as defined in claim 1, wherein generating the state identifier comprising selecting the greater of the first state probability or the second state probability.

3. A method as defined in claim 1, wherein the first sensor is an audio sensor and the second sensor is a light sensor.

4. A method as defined in claim 1, wherein the first conditional probability associated with the first parameter value is calculated during a training session occurring prior to generation of the first output signal.

5. A method as defined in claim 4, wherein the training session includes recording a first set of first parameter values and calculating a probability distribution of the first parameter values in the first set.

6. A method as defined in claim 1, wherein the first source comprises a set-top box and the second source comprises a gaming system.

7. A method as defined in claim 1, further comprising sending the state identifier to a metering entity.

8. An apparatus, comprising:
a parameter generator to:
generate, based on a first output signal from a first sensor, a first parameter value representative of a first property of a media device; and
generate, based on a second output signal from a second sensor, a second parameter value representative of a second property of the media device; and
a classifier to:
calculate a first state probability that the media device is presenting media provided by a first source based on a first conditional probability associated with the first parameter value and a second conditional probability associated with the second parameter value;
calculate a second state probability that the media device is presenting media provided by a second source different than the first source based on a third conditional probability associated with the first parameter value and a fourth conditional probability associated with the second parameter value; and
generate a state identifier by comparing the first state probability and the second state probability.

9. An apparatus as defined in claim 8, wherein the classifier is to generate the state identifier by selecting the greater of the first state probability or the second state probability.

10. An apparatus as defined in claim 8, wherein the first sensor is an audio sensor and the second sensor is a light sensor.

11. An apparatus as defined in claim 8, wherein the first conditional probability associated with the first parameter value is calculated during a training session occurring prior to generation of the first output signal.

12. An apparatus as defined in claim 11, wherein the training session includes recording a first set of first parameter values and calculating a probability distribution of the first parameter values in the first set.

13. An apparatus as defined in claim 8, wherein the first source comprises a set-top box and the second source comprises a gaming system.

14. An apparatus as defined in claim 8, further comprising a communicator to send the state identifier to a metering entity.

15. A machine readable storage device or storage disc comprising instructions that, when executed, cause a machine to at least:
generate, based on a first output signal from a first sensor, a first parameter value representative of a first property of a media device;
generate, based on a second output signal from a second sensor, a second parameter value representative of a second property of the media device;
calculate a first state probability that the media device is presenting media provided by a first source based on a first conditional probability associated with the first parameter value and a second conditional probability associated with the second parameter value;
calculate a second state probability that the media device is presenting media provided by a second source different than the first source based on a third conditional probability associated with the first parameter value and a fourth conditional probability associated with the second parameter value; and
generate a state identifier by comparing the first state probability and the second state probability.

16. A machine readable storage device or storage disc as defined in claim 15, wherein the instructions, when executed, cause the machine to generate the state identifier by selecting the greater of the first state probability or the second state probability.

17. A machine readable storage device or storage disc as defined in claim 15, wherein the first sensor is an audio sensor and the second sensor is a light sensor.

18. A machine readable storage device or storage disc as defined in claim 15, wherein the first conditional probability associated with the first parameter value is calculated during a training session occurring prior to generation of the first output signal.

19. A machine readable storage device or storage disc as defined in claim 18, wherein the training session includes recording a first set of first parameter values and calculating a probability distribution of the first parameter values in the first set.

20. A machine readable storage device or storage disc as defined in claim 15, wherein the first source comprises a set-top box and the second source comprises a gaming system.

* * * * *